(12) United States Patent
Uchida

(10) Patent No.: US 6,737,832 B2
(45) Date of Patent: May 18, 2004

(54) POWER SUPPLY APPARATUS

(75) Inventor: Hiroshi Uchida, Tokyo (JP)

(73) Assignee: NEC Corporation (JP)

( * ) Notice: Subject to any disclaimer, the term of this patent is extended or adjusted under 35 U.S.C. 154(b) by 208 days.

(21) Appl. No.: 09/999,452

(22) Filed: Oct. 31, 2001

(65) Prior Publication Data
US 2002/0050809 A1 May 2, 2002

(30) Foreign Application Priority Data

Oct. 31, 2000 (JP) ........................................ 2000-331891

(51) Int. Cl.[7] .................................................. H02J 7/00
(52) U.S. Cl. ...................................................... 320/138
(58) Field of Search ................................. 320/138, 108, 320/109, 128, 137, 140; 307/125, 130, 139, 140, 150, 85, 86; 340/636, 693.1, 693.2

(56) References Cited

U.S. PATENT DOCUMENTS

| 6,075,345 A | * | 6/2000 | Lee | ............................. 320/138 |
| 6,271,605 B1 | * | 8/2001 | Carkner et al. | ............. 307/125 |

FOREIGN PATENT DOCUMENTS

| JP | 2-55536 | 2/1990 |
| JP | 3-18781 | 1/1991 |
| JP | 6-105483 | 4/1994 |
| JP | 6-37991 | 5/1994 |
| JP | 08-037740 | 2/1996 |
| JP | 9-237640 | 9/1997 |
| JP | 2000-201485 | 7/2000 |
| JP | 2000-235065 | 8/2000 |

OTHER PUBLICATIONS

Japanese Office Action issued Oct. 10, 2003 (English translation of relevant portions).

* cited by examiner

Primary Examiner—Pia Tibbits
(74) Attorney, Agent, or Firm—Dickstein, Shapiro Morin & Oshinsky

(57) ABSTRACT

This provides a power supply apparatus, which detects a battery deterioration without any drop in an output to a load side, at a time of a voltage drop in a usual power supply or a service interruption of a commercial alternating power supply.

The power supply apparatus according to the present invention is the power supply apparatus connected to a load circuit 2, and it is provided with: a battery charge controller 52 that is connected to a battery 28 and charges the battery 28 at a first voltage; and a voltage controller 51 that is connected to the load circuit 2 and generates a second voltage and controls the second voltage so as to make a voltage supplied to the load circuit 2 constant. An electric power is supplied to the load circuit 2 from at least one of the battery 28, the battery charge controller 52 and the voltage controller 51. Moreover, it includes a diagnosing circuit 18 for diagnosing the deterioration of the battery 28, in accordance with a battery voltage.

20 Claims, 8 Drawing Sheets

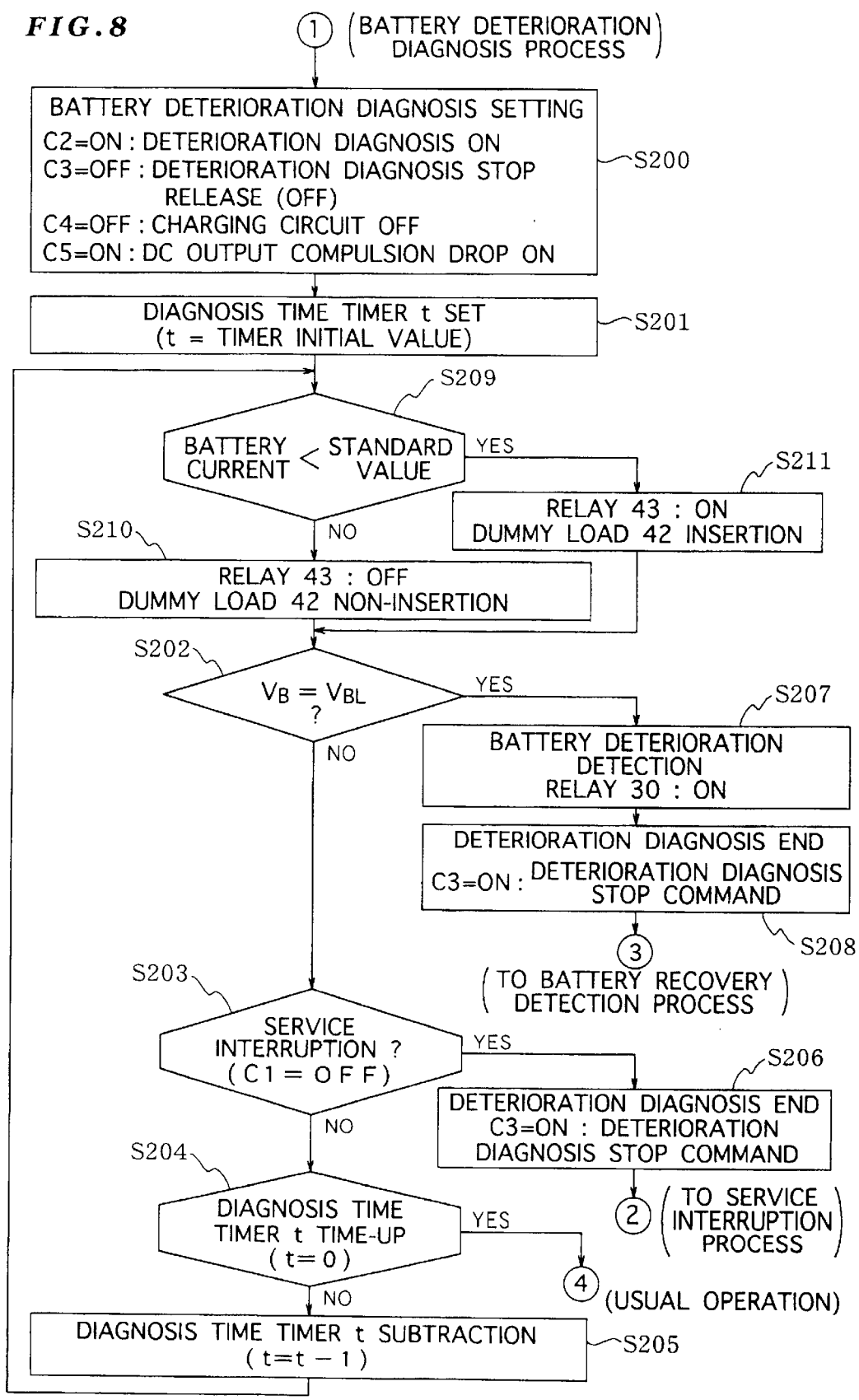

POWER SUPPLY APPARATUS

BACKGROUND OF THE INVENTION

1. Field of the Invention

The present invention relates to a power supply apparatus having a battery, and more particularly relates to a power supply apparatus that can detect a deterioration of a battery.

2. Description of the Related Art

A conventional typical power supply apparatus has an emergency battery so that a power supply to a load is not interrupted even in a case of a stop of an input power from a commercially alternating power supply or the like. As a power supply apparatus having a battery, Japanese Utility Model Publication (unexamined) No. U-6-37991 discloses an emergency report apparatus for periodically discharging a battery, and then judging whether or not the battery is deteriorated, and further reporting the deterioration.

This emergency report apparatus is provided with a charging battery, a first diode, a second diode, a first resistor, a second resistor, a first switch, a second switch, a third switch and a voltage detecting circuit. Also, a direct current power supply and a load circuit and CPU are connected to peripheral parts of the emergency report apparatus. The charging operation to the charging battery is carried out by establishing a connection between a positive side of the charging battery and a terminal side of the first resistor through the first switch and then creating the circuit in the order of the direct current power supply, the first diode, the first resistor and the charging battery. The current flowing through the charging battery is disconnected by opening the first switch and thereby disconnecting the connection between the positive side of the charging battery and the terminal side of the first resistor. The charging battery is discharged through the second resistor from the charging battery by establishing a connection between the second resistor and the positive side of the charging battery through the second switch. After that, in the emergency report apparatus, the positive side of the charging battery and a cathode side of the second diode are connected to each other by the second switch. An anode side of the second diode, a cathode side of the first diode and the circuit serving as the load are disconnected by the third switch. Accordingly, the load circuit connected through the charging battery, the second switch, the second diode and the third switch is at an open state. Then, this emergency report apparatus sends a signal indicative of a drop in a capacity of the charging battery to the CPU, if an open voltage detected by the voltage detecting circuit connected between the second switch and the positive side of the charging battery becomes equal to or less than a set value.

As another conventional example, Japanese Laid Open Patent Application (JP-A-Heisei, 2-55536) discloses a battery life judging circuit for an uninterruptible power supply apparatus. This uninterruptible power supply apparatus is provided with: a power converter for converting an electric power from a direct current power supply and supplying the electric power to a load; and a battery for supplying an electric power to the power converter instead of the direct current power supply at a time of a service interruption of the direct current power supply. Moreover, the battery life judging circuit for the uninterruptible power supply apparatus is provided with: a device for artificially interrupting the direct current power supply; a device for temporally integrating the currents discharged by the battery in the period until a voltage is dropped by a predetermined value from a battery voltage at a time of this artificial service interruption occurrence; and a device for judging whether or not this temporally integrated value of the currents is equal to or less than a predetermined value.

Japanese Laid Open Patent Application (JP-A-Heisei, 3-18781) discloses a battery check method. This conventional technique is provided with: a rectifying circuit for rectifying and outputting a current from an alternating power supply; and a voltage converter for converting and outputting a voltage of a battery at a time of a service interruption of the alternating power supply. These two output are combined and supplied to the load. This battery check method contains a control circuit for instructing the voltage converter to output an output voltage higher than an output voltage of the rectifying circuit, on the basis of an outer signal in a non-interruption period of the alternating power supply, and detects the deterioration of the battery and the charging/discharging condition thereof from a change in a terminal voltage of the battery when an electric power is supplied to a load from the battery.

Japanese Laid Open Patent Application (JP-A-Heisei, 6-105483) discloses an alternating uninterruptible power supply apparatus. In this conventional technique, an inverter which uses a battery as a power supply successively supplies an electric power to a load apparatus at a time of a voltage drop in a normal power supply or a service interruption. This alternating uninterruptible power supply apparatus defines a start order as an order of a charger, the inverter and an AC/DC converter, and then carrying out a discharge of a certain electric power from the battery. So, it has the functions of supposing an inner resistor of the battery on the basis of a voltage prior to a discharging operation from the battery and a voltage after a certain temporal elapse from the start of the discharging operation or a voltage drop value, and easily detecting and judging a life end of the battery, and further reporting this judged result to an external portion.

Also, Japanese Laid Open Patent Application (JP-A Heisei, 9-237640) discloses a battery deterioration state tester for an alternating uninterruptible power supply apparatus. This battery deterioration state tester for the alternating uninterruptible power supply apparatus judges the deterioration degree in the battery of the alternating uninterruptible power supply apparatus, which uses a battery connected through a breaker as a power supply in a case of a service interruption of an alternating power supply, and supplies an alternating electric power from an inverter circuit to a load. In this tester, a charge is discharged to the load through the inverter circuit from the battery, and the judgment is done on the basis of the discharged condition. Also, this battery deterioration state tester has a discharge test stopper, which after the start of the discharging operation, a voltage change rate of an input voltage to the inverter circuit is measured to accordingly stop the discharge test if the voltage change rate is greater than a predetermined standard value.

By the way, according to the technique disclosed in Japanese Laid Open Patent Application (JP-A-Heisei, 6-37991) the conventional power supply apparatus carries out the discharging operation after the charging battery is perfectly separated from the circuit as the load. For this reason, in this conventional power supply apparatus, if the commercial alternating power supply or the like is interrupted, the supply of the electric power is stopped from the direct current power supply after the AC/DC conversion. This results in the drop in the output to the load side.

The present invention is proposed in view of the above-mentioned circumstances.

It is therefore an object of the present invention to provide a power supply apparatus that can detect a deterioration of a battery without any drop in an output voltage to a load side, at a time of a service interruption of an alternating power supply.

Another object of the present invention is to provide a power supply apparatus that can detect a deterioration of a battery without any drop in an output voltage to a load side, even if the battery deterioration causes an output voltage from the battery to be instantly dropped, at a time of a detection of the battery deterioration.

SUMMARY OF THE INVENTION

The devices for solving the above-mentioned problems are represented as follows. Numbers, symbols and the like are affixed to the technical items corresponding to the claims in the representation. The numbers, the symbols and the like coincide with reference numbers, reference symbols and the like which are affixed to the technical items constituting at least one implementation or a plurality of embodiments among a plurality of implementations or a plurality of embodiments of the present invention, especially, the technical items represented in the drawings corresponding to the implementations or the embodiments. The numbers, the symbols and the like clarify the correspondence and relation between the technical items noted in the claims and the technical items of the implementations or the embodiments. However, the above-mentioned correspondence and relation are not intended to imply that the technical items noted in the claims are limited to the technical items in the implementations or the embodiments.

A power supply apparatus according to the present invention is the power supply apparatus connected to a load circuit 2, and it is provided with a battery charge controller 52 that is connected to a battery 28 and charges the battery 28 at a first voltage, an electric power is supplied to the load circuit 2 from the battery 28 or the battery charge controller 52. Moreover, it includes a diagnosing circuit 18 for diagnosing the deterioration of the battery 28, in accordance with a battery voltage. It should be noted, the battery 28 is excluded from the battery charge controller 52.

Moreover, a power supply apparatus according to the present invention is the power supply apparatus connected to a load circuit 2, and it is provided with: a battery charge controller 52 that is connected to a battery 28 and charges the battery 28 at a first voltage; and a voltage controller 51 that is connected to the load circuit 2 and generates a second voltage and controls the second voltage so as to make a voltage supplied to the load circuit 2 constant. An electric power is supplied to the load circuit 2 from at least one of the battery 28, the battery charge controller 52 (however, except the battery) and the voltage controller 51.

Moreover a power supply apparatus according to the present invention is the power supply apparatus connected to a load circuit 2, and it is provided with: a battery charge controller 52 that is connected to a battery 28 and charges the battery 28 at a first voltage; and a voltage controller 51 that is connected to the load circuit 2 and generates a second voltage and controls the second voltage so as to make a voltage supplied to the load circuit 2 constant. An electric power is supplied to the load circuit 2 from at least one of the battery 28, the battery charge controller 52 and the voltage controller 51. Moreover, it includes a diagnosing circuit 18 for diagnosing the deterioration of the battery 28, in accordance with a battery voltage.

Moreover a power supply apparatus according to the present invention further includes an inserting unit 43 for inserting a dummy load 42 into the load circuit 2 in series so as to make a current supplied to the load circuit 2 constant.

Moreover a power supply apparatus according to the present invention further includes a current measuring circuit 41 for measuring a value of a current supplied from the battery 28 or the battery charge controller 52, and controlling the inserting unit 43 so as to insert the dummy load 42 into the load circuit 2 in series, on the basis of the measured value and a set current value.

The battery charge controller 52 receives an alternating voltage and generates the first voltage. The diagnosing circuit 18, when an input of the alternating voltage is stopped during a diagnosis of a deterioration of the battery 28, stops the diagnosis of the deterioration of the battery 28. And, an electric power is supplied to the load circuit 2 from the battery 28 or the battery charge controller 52.

The diagnosing circuit 18 outputs a charging control signal to the battery charge controller 52, and the battery charge controller 52 charges the battery voltage in response to the charging control signal.

Moreover the diagnosing circuit 18 compares the battery voltage with a set voltage, and diagnoses the deterioration of the battery 28 in accordance with the compared result.

Moreover a power supply apparatus according to the present invention further includes an electrical reception monitor 14 for monitoring an electrical reception condition of an alternating voltage and outputting an electrical reception signal to the diagnosing circuit 18. The battery charge controller 52 receives the alternating voltage and generates the first voltage. And, the diagnosing circuit 18 stops or resumes the diagnosis of the deterioration of the battery 28, in response to the electrical reception signal.

Moreover a power supply apparatus according to the present invention further includes a period setting circuit 20 for setting a set period. The diagnosing circuit 18, if the electrical reception of the alternating voltage is stopped in the set period set by the period setting circuit 20, stops the diagnosis of the deterioration of the battery 28, and if the electrical reception of the alternating voltage is recovered, resumes the diagnosis of the deterioration of the battery 28.

A method of diagnosing a deterioration of a battery, in a power supply apparatus of the present invention is a power supply apparatus connected to a load circuit 2, comprising the steps of: (a) charging a battery 28 at a first voltage; (b) setting a set voltage; (c) comparing a battery voltage with the set voltage; (d) diagnosing the deterioration of the battery 28 in accordance with the result compared at the step (c); and (e) supplying the battery voltage or the first voltage to the load circuit 2.

Moreover a method of diagnosing a deterioration of a battery, in a power supply apparatus of the present invention is a power supply apparatus connected to a load circuit 2, comprising the steps of: (a) charging a battery 28 at a first voltage; (b) setting a set voltage; (c) comparing a battery voltage with the set voltage; (d) diagnosing the deterioration of the battery 28 in accordance with the result compared at the step (c); (f) generating a second voltage, and controlling the second voltage so as to make a voltage supplied to the load circuit 2 constant; and (g) supplying at least one voltage of the battery voltage, the first voltage and the second voltage to the load circuit 2.

Moreover a method of diagnosing a deterioration of a battery, in a power supply apparatus of the present invention further includes the step of: (h) inserting a dummy load 42 into the load circuit 2 in series so as to make a current supplied to the load circuit 2 constant.

Moreover a method of diagnosing a deterioration of a battery, in a power supply apparatus of the present invention further includes the step of: (i) setting a set current; (j) measuring a value of a current supplied from the battery 28 or a current corresponding to the second voltage; and (k) inserting the dummy load 42 into the load circuit 2 in series, on the basis of the set current and the value measured at the step (j).

Moreover a method of diagnosing a deterioration of a battery, in a power supply apparatus of the present invention further includes the steps of: (l) setting a set period; (m) executing the step (c) and the step (d) at a time of an elapse of the set period; (n) receiving an alternating voltage; (o) monitoring an electrical reception of the alternating voltage, in accordance with the set period; (p) stopping the step (c) and the step (d) when the electrical reception of the alternating voltage is stopped; and (q) resuming the step (c) and the step (d) when the electrical reception of the alternating voltage is recovered.

Moreover a method of diagnosing a deterioration of a battery, in a power supply apparatus of the present invention further includes the steps of: (r) stopping the step (c) and the (d) when the battery 28 is diagnosed as a deterioration at the step (d); and (s) resuming the step (c) and the step (d) when the battery diagnosed as the deterioration is recovered.

From the above-mentioned explanations, the power supply apparatus according to the present invention, when diagnosing the battery deterioration, uses the actually connected load 2 as the load to be used to forcedly discharge the battery 28. Thus, even if the AC power supply is accidentally interrupted during the diagnosis of the battery deterioration, the DC output is supplied in its original state from the battery 28 to the load 2. Hence, the battery deterioration can be diagnosed without any drop in the output to the load side.

Also, the power supply apparatus according to the present invention is characterized in that at the time of the battery deterioration diagnosis, even if the battery deterioration causes the DC output from the battery 28 to be instantly dropped, the output to the connected load side is not dropped. In the battery deterioration diagnosis of the power supply apparatus 1, 101 according to the present invention, the minimum DC voltage is reserved in the AC/DC converter 151. So, when the battery deterioration diagnosing unit 53 diagnoses the battery deterioration, even if the battery deterioration causes the DC output from the battery 28 to be instantly dropped, the minimum DC voltage can be outputted to the load 2 from the AC/DC converter 51 without any influence on the load 2 side.

BRIEF DESCRIPTION OF THE DRAWINGS

FIG. 8 is a flowchart showing an operation of a process for diagnosing a battery deterioration, in the power supply apparatus according to the second embodiment.

DETAILED DESCRIPTION OF THE PREFERRED EMBODIMENT

Embodiments of a power supply apparatus according to the present invention will be described below with reference to the attached drawings.

(First Embodiment)

Figure 1:
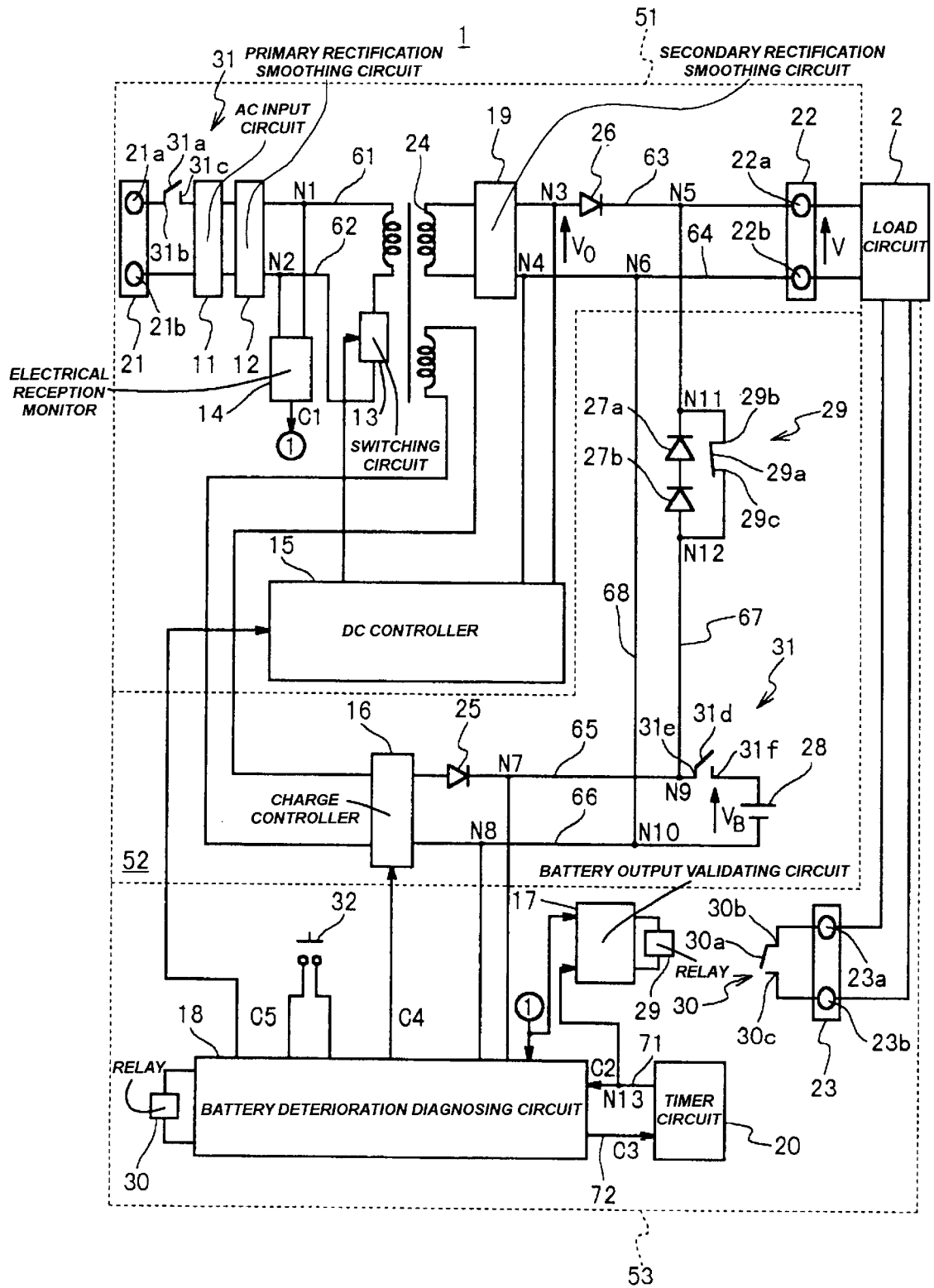
FIG. 1 is a block diagram showing a configuration of a power supply apparatus according to a first embodiment of the present invention.

FIG. 1 is a block diagram showing the configuration of the power supply apparatus according to the first embodiment.

As shown in FIG. 1, a symbol 1 denotes the power supply apparatus according to the first embodiment. This power supply apparatus 1 is provided with an AC/DC converter 51, a battery charge controller 52 and a battery deterioration diagnosing unit 53. The AC/DC converter 51 has an AC input circuit 11, a primary rectification smoothing circuit 12, a switching circuit 13, an electrical reception monitor 14, a DC controller 15, a secondary rectification smoothing circuit 19, a plug 21, a DC output connector 22, a transformer 24, a diode 26 and a power supply switch 31.

The battery charge controller 52 has a charge controller 16, a diode 25, a diode 27a, a diode 27b and a battery 28. The battery deterioration diagnosing unit 53 has a battery output validating circuit 17, a battery deterioration diagnosing circuit 18, a timer circuit 20, an output connector 23, a relay 29, a relay 30 and a battery recovery switch 32.

Also, an external unit 2 having a load circuit used to forcedly discharge the battery 28 is connected to the power supply apparatus 1. By the way, the plug 21, the DC output connector 22 and the output connector 23 shown in FIG. 1 are illustrated in order to explain the power supply apparatus 1 according to the first embodiment. Although they are necessary for the typical power supply apparatus, an explanation of the shapes of the plug 21, the DC output connector 22 and the output connector 23 are omitted.

At first, the AC/DC converter 51 in the power supply apparatus 1 is described.

As shown in FIG. 1, the plug 21 is connected to a power supply line connected to the AC input circuit 11, in order to supply an alternating voltage (hereafter, referred to as an AC voltage) to the AC input circuit 11. That is, this plug 21 has one terminal 21a and the other terminal 21b to connect the respective power supply lines.

The power supply switch 31 is a linkage switch having two a-contact (arbeit contact) switches. This power supply switch 31 is composed of a switch 31a connected to a power supply line between an input terminal of the AC input circuit 11 and one terminal 21a of the plug 21, and a switch 31d connected to a positive side of the battery 28. The switch 31a has a terminal 31b and a terminal 31c. The terminal 31b is connected to the side of the plug 21, and the terminal 31c is connected to the side of the AC input circuit 11. If the switch 31a is turned ON, the terminal 31b and the terminal 31c are connected to each other, and if it is turned OFF, the connection between the terminal 31b and the terminal 31c is opened. This switch 31a of the power supply switch 31 is intended to turn ON/OFF if the AC voltage is applied to the AC input circuit 11. The switch 31d has a terminal 31e and a terminal 31f. The terminal 31e is connected to the side of the charge controller 16, and the terminal 31f is connected to the side of the battery 28. If the switch 31d is turned ON, the terminal 31e and the terminal 31f are connected to each other, and if it is turned OFF, the connection between the terminal 31e and the terminal 31f is opened. This switch 31d of the power supply switch 31 is intended to turn ON/OFF the output of the battery 28.

The AC input circuit 11 receives a predetermined AC voltage, from a power supply line connected to one input terminal of the AC input circuit 11 from one terminal 21a of the plug 21, and a power supply line connected to the other input terminal of the AC input circuit 11 from the other terminal 21b of the plug 21. The AC input circuit 11, if the switch 31a is closed, receives the AC voltage from the plug 21, and attenuates an external noise coming from the power supply line. This AC input circuit 11 is composed of: a noise filter for suppressing a transmission noise occurring in the power supply apparatus 1 and the like; and a rush current protection circuit for suppressing a rush current generated when the power supply switch 31 is turned on.

The primary rectification smoothing circuit 12 receives a predetermined AC voltage, from a power supply line connected to one input terminal of the primary rectification smoothing circuit 12 from one output terminal of the AC input circuit 11, and a power supply line connected to the other input terminal of the primary rectification smoothing circuit 12 from the other output terminal of the AC input circuit 11. The primary rectification smoothing circuit 12 receives the AC voltage from the AC input circuit 11, and rectifies and smoothes the AC voltage. Then, the primary rectification smoothing circuit 12 outputs the rectified smoothed voltage from a power supply line 61 connected to a terminal on a primary side in the transformer 24 from an output terminal of the primary rectification smoothing circuit 12, and a power supply line 62 connected to an input terminal of the switching circuit 13 from the other output terminal of the primary rectification smoothing circuit 12.

The electrical reception monitor 14 receives the voltage rectified and smoothed by the primary rectification smoothing circuit 12. This electrical reception monitor 14 receives the rectified smoothed voltage through a power supply line branched from a branch point N1 of the power supply line 61 and a power supply line branched from a branch point N2 of the power supply line 62. The electrical reception monitor 14 monitors the output voltage of the primary rectification smoothing circuit 12 to thereby monitor the AC reception state, and then outputs the result as an electric reception monitor signal C1 to the battery output validating circuit 17 and the battery deterioration diagnosing circuit 18.

The transformer 24 receives the rectified smoothed voltage through a power supply line 61 connected to one terminal on a primary side of the transformer 24 from the output terminal of the primary rectification smoothing circuit 12 and a power supply line connected to the other terminal on the primary side of the transformer 24 from the output terminal of the switching circuit 13. Then, it generates a first secondary voltage and a second secondary voltage from the rectified smoothed voltage. The transformer 24 outputs the first secondary voltage through a power supply line connected to one input terminal of the secondary rectification smoothing circuit 19 from one terminal on the first secondary side of the transformer 24 and a power supply line connected to the other input terminal of the secondary rectification smoothing circuit 19 from the other terminal on the first secondary side of the transformer 24. Also, the transformer 24 outputs the second secondary voltage from a power supply line connected to one input terminal of the charge controller 16 from one terminal on the second secondary side of the transformer 24 and a power supply line connected to the other input terminal of the charge controller 16 from the other terminal on the second secondary side of the transformer 24.

The secondary rectification smoothing circuit 19 receives the first secondary voltage through a power supply line connected to one input terminal of the secondary rectification smoothing circuit 19 from one terminal on the first secondary side of the transformer 24 and a power supply line connected to the other input terminal of the secondary rectification smoothing circuit 19 from the other terminal on the first secondary side of the transformer 24, and rectifies and smoothes it, and then converts into a DC output voltage $V_o$.

The DC output connector 22 connects the power supply lines through which the secondary rectification smoothing circuit 19 and the external unit 2 are connected, in order to supply the DC output voltage to the external unit 2 from the secondary rectification smoothing circuit 19. This DC output connector 22 has a terminal 22a and a terminal 22b to connect the power supply lines. The secondary rectification smoothing circuit 19 outputs the DC output voltage $V_o$ to the external unit 2 through a power supply line 63 connected to the terminal 22a of the DC output connector 22 from one output terminal of the secondary rectification smoothing circuit 19 and a power supply line 64 connected to the terminal 22b of the DC output connector 22 from the other output terminal of the secondary rectification smoothing circuit 19. The diode 26 is connected to the power supply line 63. The diode 26 is a reverse flow protection diode. A cathode electrode is arranged on the side of the secondary rectification smoothing circuit 19, and an anode electrode is arranged on the side of the DC output connector 22.

The DC controller 15 receives the DC output voltage $V_o$ rectified and smoothed by the secondary rectification smoothing circuit 19. This DC controller 15 receives the DC output voltage $V_o$ through a power supply line branched from a branch point N3 of the power supply line 63 and a power supply line branched from a branch point N4 of the power supply line 64. Also, the DC controller 15 receives an output voltage compulsion drop signal C5 to at least reserve the DC output voltage $V_o$ from the battery deterioration diagnosing circuit 18. This DC controller 15 controls a switching frequency, in order to adjust the DC output voltage $V_o$ from the secondary rectification smoothing circuit 19, and outputs to the switching circuit 13.

The battery charge controller 52 in the power supply apparatus 1 will be described below.

As shown in FIG. 1, the charge controller 16 receives the second secondary voltage through a power supply line connected to one input terminal of the charge controller 16 from one terminal on the second secondary side of the transformer 24 and a power supply line connected to the other input terminal of the charge controller 16 from the other terminal on the second secondary side of the transformer 24. Then, it converts this secondary voltage into a DC voltage to charge the battery 28. Also, the charge controller 16 receives a charging circuit control signal C4 to execute the conversion into the DC voltage, from the battery deterioration diagnosing circuit 18.

Also, the battery 28 is a backup battery for a service interruption, in order to allow a voltage to be supplied to the external unit 2 even in the service interruption of the AC voltage. Here, the voltage supplied by the battery 28 is a battery output voltage $V_B$. The battery 28 receives a DC voltage through a power supply line 65 connected to a positive electrode of the battery 28 from one output terminal of the charge controller 16 and a power supply line 66 connected to a negative electrode of the battery 28 from the other output terminal of the charge controller 16. The diode 25 and the switch 31d are connected to the power supply line 65. Here, the diode 25 is the diode for protecting a current from reversely flowing into the charge controller 16 from the battery 28. A cathode electrode is arranged on the side of the charge controller 16, and an anode electrode is arranged on the side of the switch 31d.

If the switch 31b is closed, the battery 28 can supply a voltage to the external unit 2 at the time of the service interruption of the AC voltage, through a connection path 67 through which a branch point N5 of the power supply line 63 and a branch point N9 of the power supply line 65 are connected, and a connection path 68 through which a branch point N6 of the power supply line 64 and a branch point N10 of the power supply line 66 are connected. Here, the branch point N5 is located on the power supply line 63 between the diode 26 and the DC output connector. The branch point N9 is located on the power supply line 65 between the diode 25 and the switch 31b. A diode 27a and a diode 27b are connected to the connection path 67. In the diode 27a, an anode electrode is arranged on the side of the branch point N5, and a cathode electrode is arranged on the side of an anode electrode of the diode 27b. Also, in the diode 27b, an anode electrode is arranged on the side of the cathode electrode of the diode 27a, and a cathode electrode is arranged on the side of the branch point N9. The diodes 27a, 27b drop the battery output voltage $V_B$ SO that the voltage is not supplied to the external unit 2 from the battery 28 when the AC voltage is received.

The battery deterioration diagnosing unit 53 in the power supply apparatus 1 will be described below.

As shown in FIG. 1, the battery deterioration diagnosing circuit 18 monitors the battery output voltage $V_B$ at the time of the discharge from the battery 28, through a power supply line branched from a branch point N7 of the power supply line 65 and a power supply line branched from a branch point N8 of the power supply line 66. The relay 30, the battery recovery switch 32 and the timer circuit 20 are connected to the battery deterioration diagnosing circuit 18. Also, in the battery deterioration diagnosing circuit 18, a battery deterioration judgment voltage $V_{BL}$ is set as a voltage lower than the battery output voltage $V_B$. This battery deterioration judgment voltage $V_{BL}$ is the voltage set in order to judge that the battery output voltage $V_B$ indicates the battery deterioration. The battery deterioration diagnosing circuit 18, if the battery output voltage $V_B$ is lower than the battery deterioration judgment voltage $V_{BL}$ as the judged result, outputs a current for exciting the relay 30, to the relay 30. The battery deterioration diagnosing circuit 18 receives the electric reception monitor signal C1 from the electrical reception monitor 14. Also, the battery deterioration diagnosing circuit 18 receives a battery deterioration diagnosis signal C2 from the timer circuit 20, and outputs a battery deterioration diagnosis stop signal C3 to the timer circuit 20. Moreover, the battery deterioration diagnosing circuit 18 outputs a charging circuit control signal C4 to the charge controller 16, and outputs an output voltage compulsion drop signal CS to the DC controller 15.

The relay 30 is the relay for detecting the battery deterioration, which is connected to the battery deterioration diagnosing circuit 18. Also, the relay 30 is the latch relay having a relay contact 30a of a contact. The relay contact 30a of the relay 30 has a terminal 30b and a terminal 30c. The relay 30 is excited if the battery deterioration diagnosing circuit 18 diagnoses the battery as the deterioration. In this relay contact 30a, if a current by which the relay 30 can be excited flows from the battery deterioration diagnosing circuit 18, the terminal 30b and the terminal 30c are connected to each other. Here, the case when the relay 30 is excited is referred to as ON and the case when the excitation of the relay 30 is released is referred to as OFF.

The output connector 23 connects the power supply line through which the external unit 2 and the relay contact 30a of the relay 30 are connected to each other. This output connector 23 has a terminal 23a and a terminal 23b which are connected to the external unit 2, respectively. If the battery deterioration diagnosing circuit 18 diagnoses the battery as the deterioration, the relay 30 connects a power supply line connected to the terminal 23a of the output connector 23 from the terminal 30b of the relay contact 30a and a power supply line connected to the terminal 23b of the output connector 23 from the terminal 30c of the relay contact 30a to each other.

The battery recovery switch 32 is connected to the battery deterioration diagnosing circuit 18. If the battery recovery switch 32 is pushed, a current by which the relay contact 30a can be opened flows into the relay 30 from the battery deterioration diagnosing circuit 18. Here, the case when the battery recovery switch 32 is pushed is referred to as ON. In this relay contact 30a, the connection between the terminal 30b and the terminal 30c is opened if a current by which the relay 30 can be turned OFF flows from the battery deterioration diagnosing circuit 18.

The timer circuit 20 is connected to the battery deterioration diagnosing circuit 18, and it clocks a time required to diagnose a battery deterioration. The timer circuit 20 outputs the battery deterioration diagnosis signal C2 from a line 71 from which a signal is outputted to the battery deterioration diagnosing circuit 18, and receives the battery deterioration diagnosis stop signal C3 from a line 72 from which a signal is received from the battery deterioration diagnosing circuit 18.

The battery output validating circuit 17 receives the battery deterioration diagnosis signal C2 generated by the timer circuit 20, from a line branched from a branch point N13 of the line 71. The battery output validating circuit 17 receives the electric reception monitor signal C1 from the electrical reception monitor 14. Also, the battery output validating circuit 17 is connected to the relay 29. In the relay 29, the ON/OFF operation is determined in accordance with the electric reception monitor signal C1 and the battery deterioration diagnosis signal C2 received from the battery output validating circuit 17. If the relay 29 is turned ON, the battery output validating circuit 17 outputs a current for exciting the relay 29, to the relay 29.

The relay 29 has a relay contact 29a of a b contact (brake contact), and it is the relay intended to short-circuit both ends of the diodes 27a, 27b. The relay contact 29a of the relay 29 is placed on both ends of the diode 27, and it is connected in parallel thereto. The relay contact 29a of the relay 29 has a terminal 29b and a terminal 29c. In the relay contact 29a of the relay 29, the terminal 29b is connected to a power supply line branched from a branch point N11 of the connection path 67, and the terminal 29c is connected to a power supply line branched from a branch point N12 of the connection path 67. The relay 29 short-circuits both the ends of the diode 27 if the terminal 29b and the terminal 29c are connected to each other. In the relay contact 29a, the connection between the terminal 29b and the terminal 29c is opened when a current by which the relay 29 can be excited flows from the battery output validating circuit 17. Here, the case when the relay 29 is excited is referred to as ON, and the case when it is not excited is referred to as OFF.

The supply of the voltage to the external unit 2 in the power supply apparatus 1 according to the first embodiment will be described below in detail with reference to FIG. 1.

As shown in FIG. 1, in the power supply apparatus 1, since the power supply switches 31 (as the initial state, let us suppose that the sides of the terminal 31b and the terminal 31e are at the contact state, and the sides of the terminal 31c and the terminal 31f are at the open state) are turned ON, the switch 31a and the switch 31b are made to contact. At this time, the AC voltage of the AC power supply is converted into the DC output voltage through the AC input circuit 11, the primary rectification smoothing circuit 12, the transformer 24 and the secondary rectification smoothing circuit 19. After that, in the power supply apparatus 1, the DC controller 15 controls the switching circuit 13 so that the DC output voltage $V_o$ of the secondary rectification smoothing circuit 19 is kept at a constant voltage $V_N$. Here, the switching circuit 13 is controlled such that a value in which a voltage of the diode 26 is subtracted from the output voltage $V_N$ of the secondary rectification smoothing circuit 19 is greater than a value in which a voltage of the diodes 27a, 27b is subtracted from the battery output voltage $V_B$, namely, so as to generate the output voltage $V_N$ that can satisfy the equation of (the output voltage $V_N$ of the secondary rectification smoothing circuit 19–the voltage drop of the diode 26)>(the battery output voltage $V_N$–voltage drop of the diode 27). For this reason, as for the output voltage from the DC output connector 22, the voltage in which the voltage of the diode 26 is subtracted from the output voltage $V_N$ of the secondary rectification smoothing circuit 19 is outputted (the output voltage $V_N$ of the secondary rectification smoothing circuit 19–the voltage drop of the diode 26).

Unless otherwise specified, the following explanation is done assuming that the output voltage of the secondary rectification smoothing circuit 19 includes the voltage drop of the diode 26. Here, (the output voltage $V_N$ of the secondary rectification smoothing circuit 19)–(the voltage drop of the diode 26) is the output voltage $V_N$.

Also, the power supply apparatus 1 supplies the second secondary voltage through the transformer 24 to the charge controller 16. The charge controller 16 converts the second secondary voltage into the DC voltage. The converted DC voltage is correlated to the charging current of the battery 28. The charging current is passed through the diode 25 for protecting the reverse flow and used to charge the battery 28. The voltage outputted from the battery 28 is the above-mentioned battery output voltage $V_B$.

Accordingly, the voltage is supplied to the external unit 2 from at least one of the AC/DC converter 51, the battery charge controller 52 and the battery 28.

The operation of the power supply apparatus 1 according to the first embodiment will be described below with reference to FIGS. 2 to 6.

Figure 2:
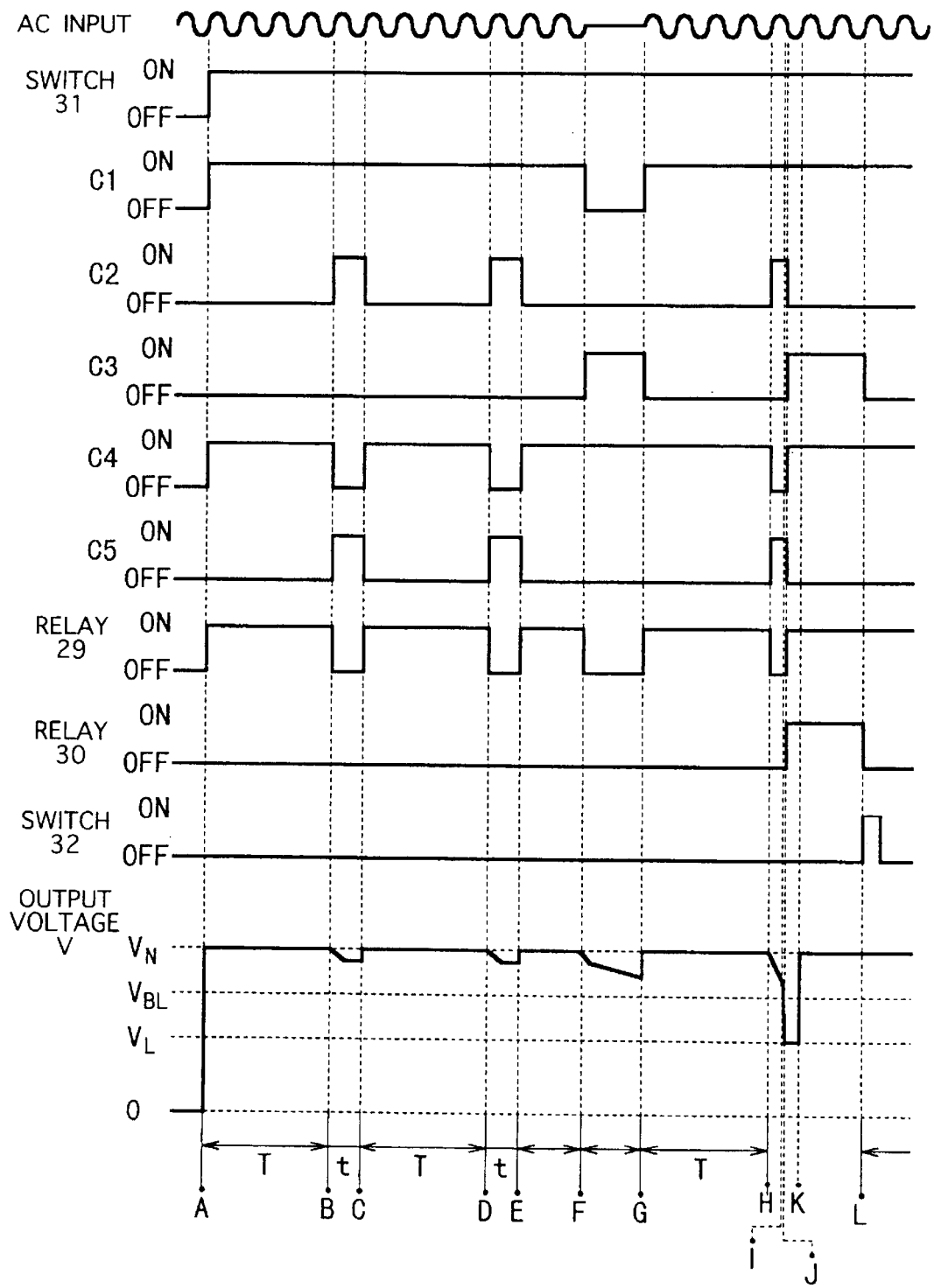
FIG. 2 is a view showing a timing chart in the power supply apparatus according to the first embodiment and a voltage change in an output voltage from a DC output connector.
Figure 3:
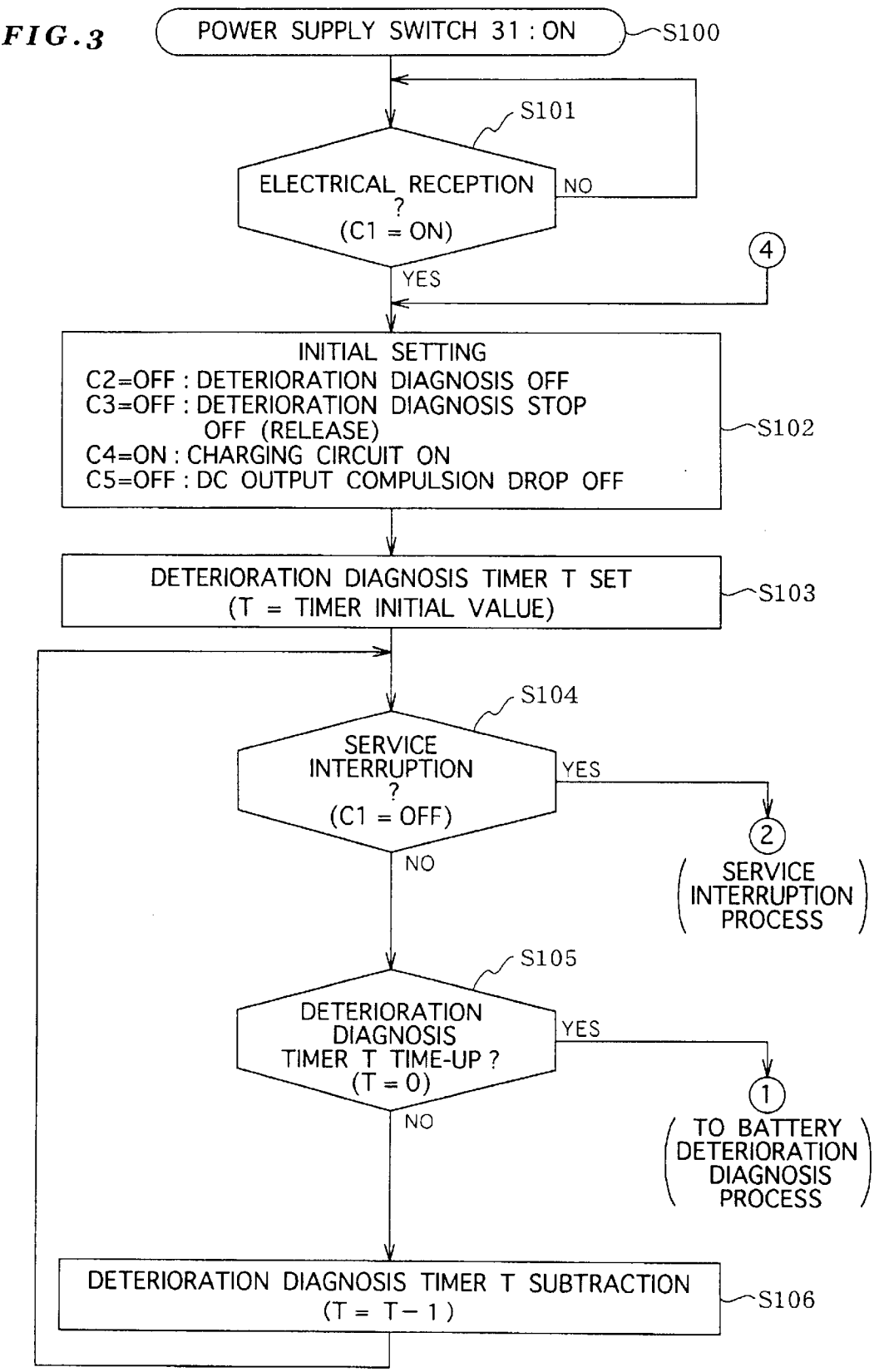
FIG. 3 is a flowchart showing an operation of the power supply apparatus according to the first embodiment.
Figure 4:
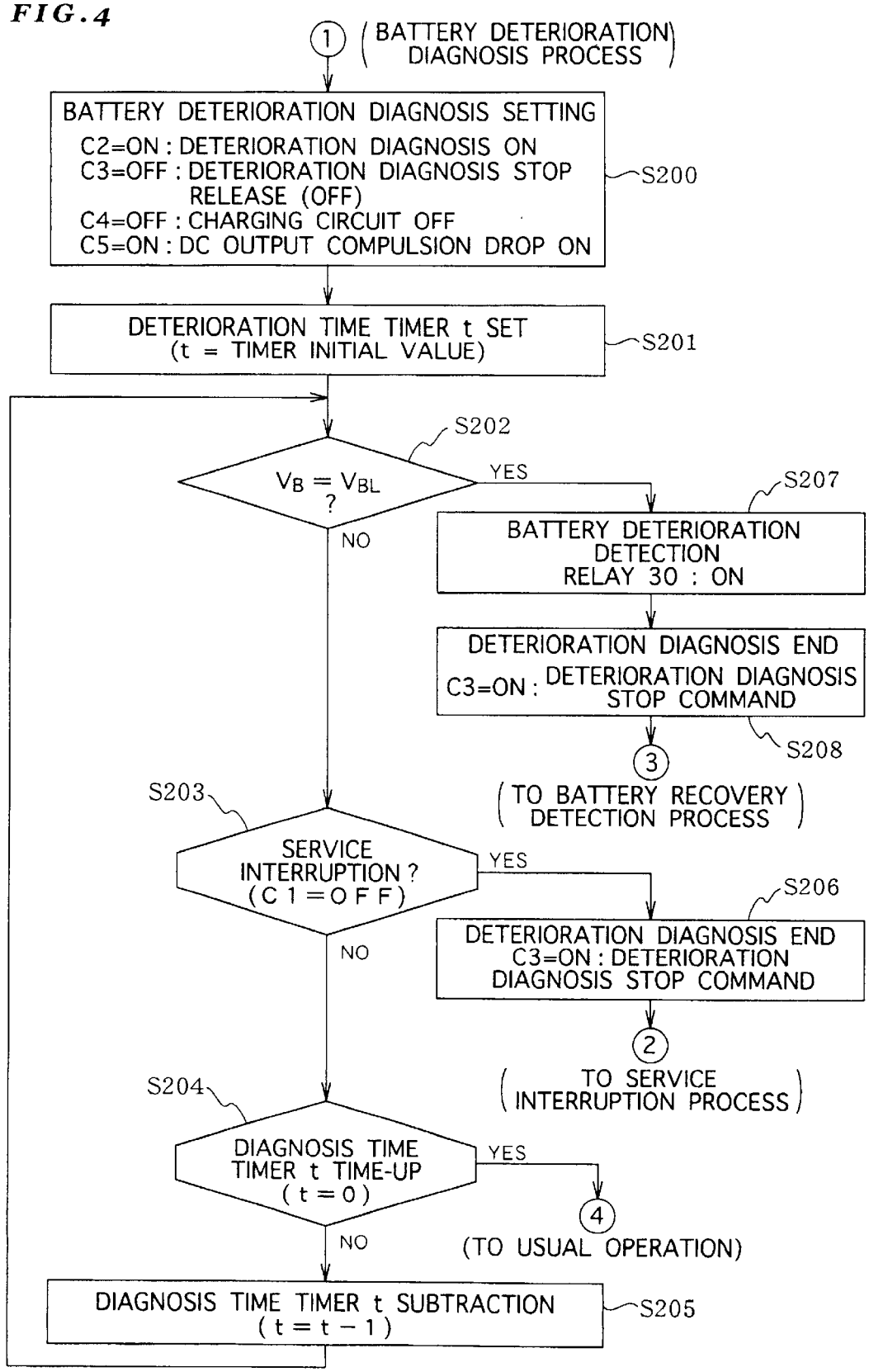
FIG. 4 is a flowchart showing an operation of a process for diagnosing a battery deterioration, in the power supply apparatus according to the first embodiment.
Figure 5:
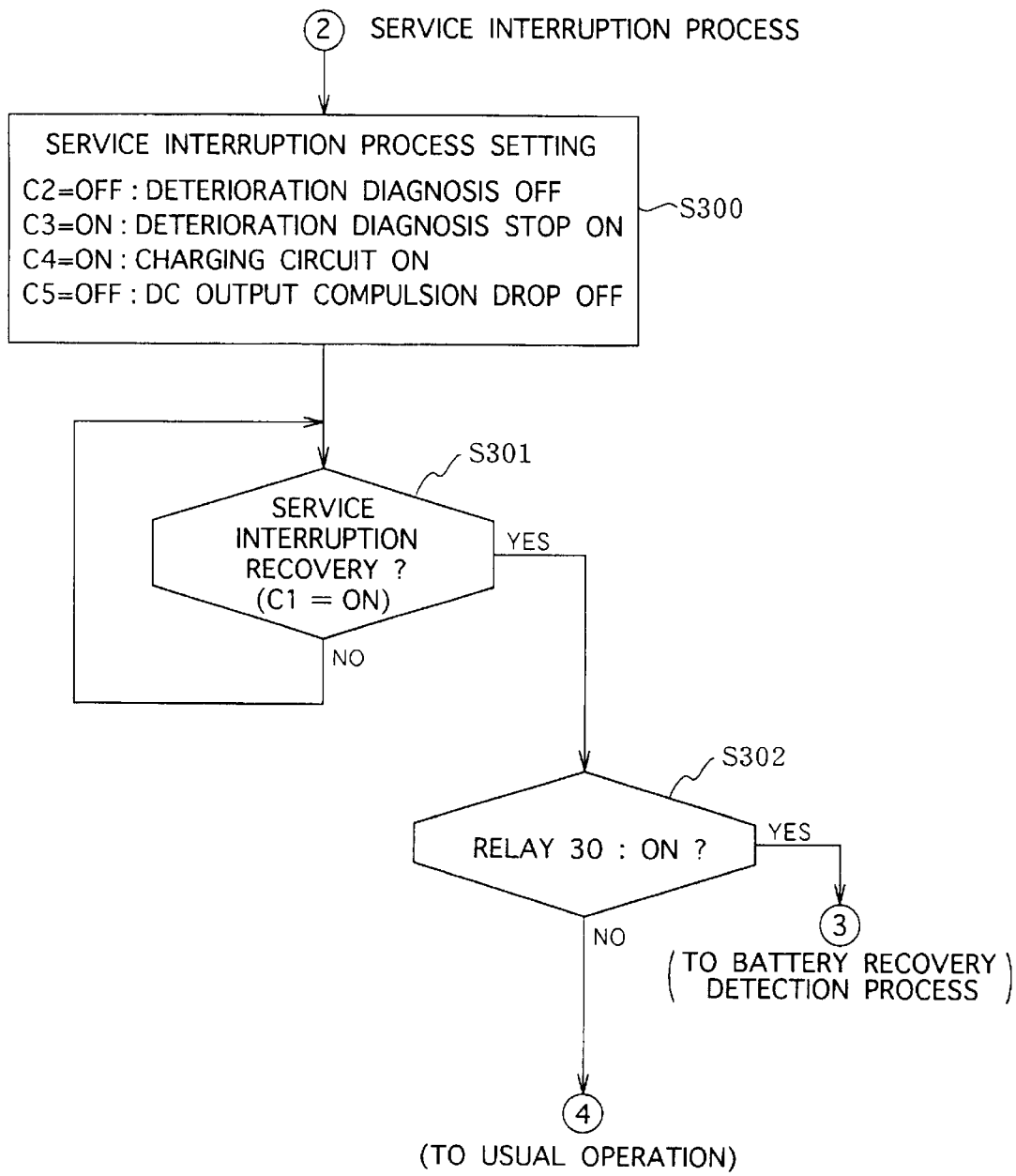
FIG. 5 is a flowchart showing an operation of a service interruption process in the power supply apparatus according to the first embodiment.
Figure 6:
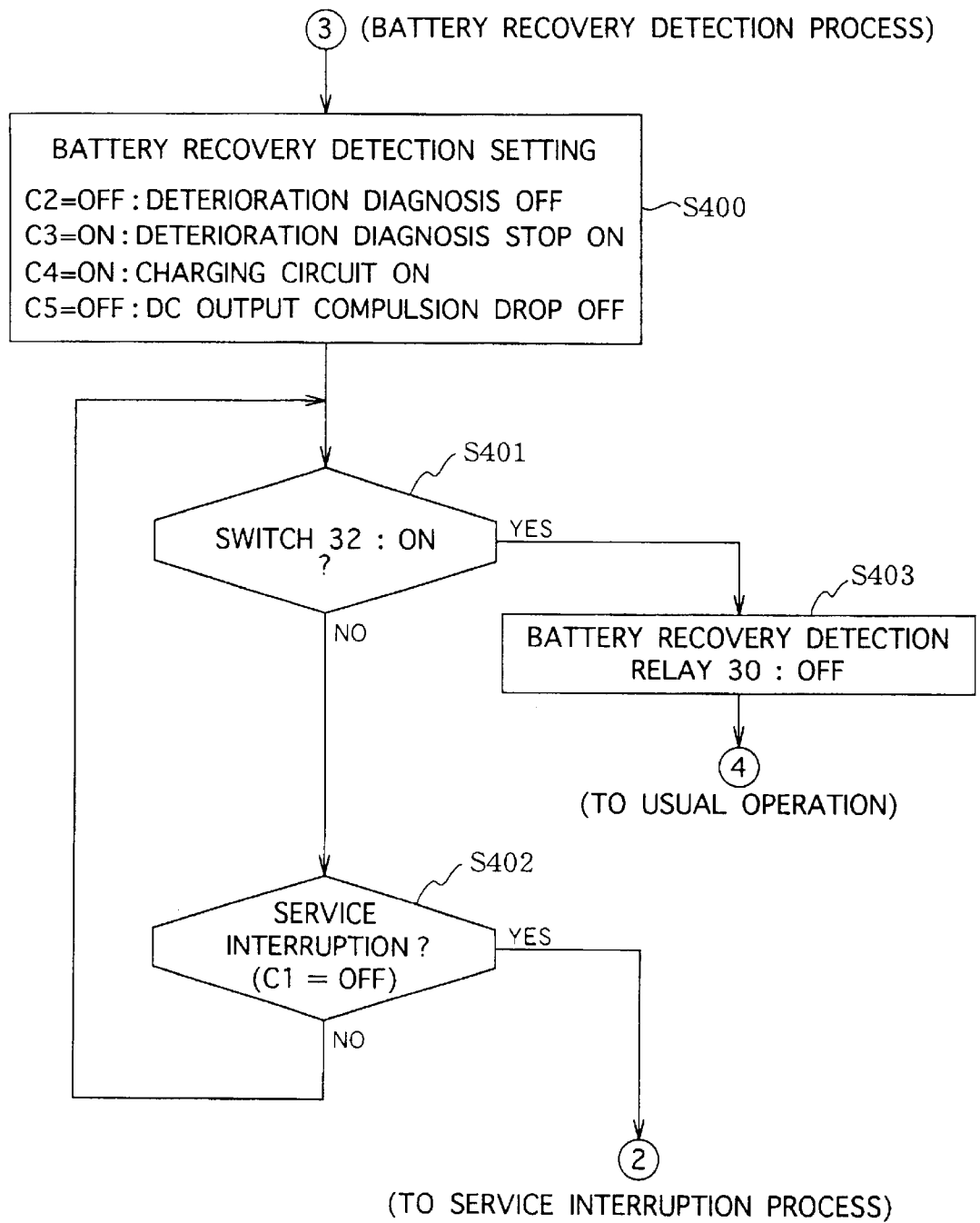
FIG. 6 is a flowchart showing an operation of a process for detecting a battery recovery, in the power supply apparatus according to the first embodiment.

FIG. 2 is a view showing a timing chart in the power supply apparatus according to the first embodiment, and a voltage change in the output voltage from the DC output connector. FIG. 3 is a flowchart showing the operation of the power supply apparatus according to the first embodiment. FIG. 4 is a flowchart showing the operation of the process for diagnosing the battery deterioration, in the power supply apparatus according to the first embodiment. FIG. 5 is a flowchart showing the operation of the service interruption process in the power supply apparatus according to the first embodiment. And, FIG. 6 is a flowchart showing the operation of the process for detecting the battery recovery, in the power supply apparatus according to the first embodiment.

As shown in FIG. 3, in the power supply apparatus 1, when the switch 31 is turned ON, the operation is started (Step S100). In the power supply apparatus 1, the electrical reception monitor 14 judges whether the electric reception is detected or not (Step S101). If the electric reception monitor signal C1 of the electrical reception monitor 14 is ON (YES at Step S101), the power supply apparatus 1 carries out the initial setting. At this time, the power supply apparatus 1 turns OFF the battery deterioration diagnosis signal C2 and the deterioration diagnosis stop signal C3 as a deterioration diagnosis non-execution control, and turns ON the charging circuit control signal C4 as a battery charging circuit ON control, and then turns OFF the output voltage compulsion drop signal C5 as a usual DC output (voltage $V_N$) control (Step S102). In this way, with reference to the timing chart shown in FIG. 2, if the switch 31 is turned ON, an AC input of a sine wave is inputted to the power supply apparatus. Also, the electric reception monitor signal C1, the charging circuit control signal C4 and the relay 29 are ON. And, the battery deterioration diagnosis signal C2, the deterioration diagnosis stop signal C3, the output voltage compulsion drop signal C5, the relay 30 and the battery recovery switch 32 are OFF (Point A). Also, a level of an output voltage V from the DC output connector 22 shown in FIG. 2 is $V_N$ (Point A)

Next, as shown in FIG. 3, the power supply apparatus 1, after the control of the signal at the step S102, sets a deterioration diagnosis timer T by using the timer circuit 20 (Step S103). Then, the power supply apparatus 1 judges whether or not it is at the situation of the service interruption. If the electric reception monitor signal C1 of the electrical reception monitor 14 is OFF (NO at Step S104, the operational flow of the power supply apparatus 1 proceeds to an initial diagnosis timer T (Step S105). If the deterioration diagnosis timer T of the timer circuit 20 does not reach at a time-up state, the operational flow of the power supply apparatus 1 proceeds to a deterioration diagnosis timer T subtraction (Step S106). Then, the power supply apparatus 1 decrements the content of the deterioration diagnosis timer T of the timer circuit 20, and the operational flow returns back to the step S104. In this way, the power supply apparatus 1 repeats the operations at the steps S104 to S106 until the deterioration diagnosis timer T of the timer circuit 20 becomes at the time-up state, and counts down the deterioration diagnosis timer T. If the deterioration diagnosis timer T becomes at the time-up state (YES at Step S105), the operational flow of the power supply apparatus 1 proceeds to the process for diagnosing the battery deterioration. By the way, if the deterioration diagnosis timer T is at the count-down state (Steps S104 to S106), the power supply apparatus 1 also monitors the electric reception monitor signal C1 from the electrical reception monitor 14. On the other hand, if the electric reception monitor signal C1 is turned OFF, namely, if the AC power supply becomes at the state of the service interruption (YES at Step S104), the operational flow of the power supply apparatus 1 proceeds to the service interruption process.

The process for diagnosing the battery deterioration will be described below with reference to FIG. 4.

As shown in FIG. 4, the power supply apparatus 1 carries out a battery deterioration diagnosis setting, if the deterioration diagnosis timer T of the timer circuit 20 becomes at the time-up state. At this time, the power supply apparatus 1 turns ON the battery deterioration diagnosis signal C2, as the control for the battery deterioration diagnosis, namely, as the execution of the deterioration diagnosis, and turns OFF the deterioration diagnosis stop signal C3, and then turns OFF the battery charging circuit control signal C4 as the battery charging circuit OFF control, and further turns ON the output voltage compulsion drop signal C5 so that the DC output is forced to be controlled to an output minimum voltage $V_L$ (Step S200). The battery output validating circuit 17, since the battery deterioration diagnosis signal C2 becomes ON, turns OFF the relay 29, and short-circuits both the ends of the diode 27. Thus, the battery output voltage $V_B$ is outputted in its original state from the DC output connector 22 (at this time, the battery output voltage $V_B$>the output minimum voltage $V_L$ of the DC output). Here, the relay 29 in the battery output validating circuit 17 is controlled so as to become ON (namely, it does not short-circuit both the ends of the diode 27) only if the battery deterioration diagnosis signal C2 inputted to the battery output validating circuit 17 is OFF and the electric reception monitor signal C1 is ON). As mentioned above, with reference to the timing chart shown in FIG. 2, if the deterioration diagnosis timer T of the timer circuit 20 becomes at the time-up state, the switch 31, the electric reception monitor signal C1, the battery deterioration diagnosis signal C2 and the output voltage compulsion drop signal C5 are ON, and the deterioration diagnosis stop signal C3, the charging circuit control signal C4, the relay 29, the relay 30 and the battery recovery switch 32 are OFF (Points B, D and H).

Next, as shown in FIG. 4, the power supply apparatus 1 sets a diagnosis time timer t by using the timer circuit 20 (Step S201). Then, the power supply apparatus 1 monitors the battery output voltage $V_B$ (Step S202). Meanwhile, if the battery output voltage $V_B$ is not dropped to the battery deterioration judgment voltage $V_{BL}$ from which the battery is judged as the deterioration (NO at Step S202), the power supply apparatus 1 judges whether or not it is interrupted (Step S203). If the electric reception monitor signal C1 of the electrical reception monitor 14 is not OFF (NO at Step S203), the operational flow of of the power supply apparatus 1 proceeds to the diagnosis time timer t (Step S204). Next, if the diagnosis time timer t of the timer circuit 20 is not at the time-up state, the operational flow of of the power supply apparatus 1 proceeds to a diagnosis time timer t subtraction (Step S205). Here, the power supply apparatus 1 decrements the content of the diagnosis time timer t of the timer circuit 20, and the operational flow returns back to the step S202. In this way, the power supply apparatus 1 repeats the operations at the steps S202 to S205 until the diagnosis time timer t of the timer circuit 20 becomes at the time-up state, and counts down the diagnosis time timer t. In the power supply apparatus 1, as the monitored result of the battery output voltage $V_B$ (Step S202), if the battery output voltage $V_B$ is dropped to the battery deterioration judgment voltage $V_{BL}$ from which the battery is judged as the deterioration (YES at Step S202), the power supply apparatus 1 judges that the battery is deteriorated, and turns ON a battery deterioration detection relay 30, and then sends a battery deterioration signal from the connector 23 to the external unit 2 (Step S207). At the same time, the power supply apparatus 1 turns ON the deterioration diagnosis stop signal C3 as a deterioration diagnosis stop command, and stops the battery deterioration diagnosis. Then, the operational flow of the power supply apparatus 1 proceeds to the process for detecting a recovery (Step S208).

As mentioned above, as for the level of the output voltage V from the DC output connector 22 shown in FIG. 2, although the battery output voltage $V_B$ is dropped to the battery deterioration judgment voltage $V_{BL}$ (Point I) and the battery output voltage $V_B$ is deteriorated and dropped to the output minimum voltage $V_L$ or less (Point J), it becomes the DC output voltage $V_o$ (=$V_L$) of the secondary rectification smoothing circuit 19>the battery output voltage $V_B$ (=$V_L$). The power supply apparatus 1, until the stop of the deterioration diagnosis (Point K), carries out the AC/DC conversion from the DC output connector 22, and outputs the output minimum voltage $V_L$ by using the output voltage compulsion drop signal C5 and the DC controller 15 so that the output to the external unit 2 is not dropped. Accordingly, in the power supply apparatus 1 shown in FIG. 1, at the time of the battery deterioration diagnosis, even if the battery deterioration causes the DC output from the battery 28 to be instantly dropped, the output to the connected load side is not dropped. That is, the battery deterioration diagnosis of the power supply apparatus 1 has no influence on the load side, even if the battery deterioration causes the DC output from the battery 28 to be instantly dropped, when the battery deterioration diagnosing unit 53 diagnoses the battery deterioration, since the minimum DC voltage is reserved in the AC/DC converter 51.

If the diagnosis time timer t is counted down (Steps S202 to S205), the power supply apparatus 1 also monitors the electric reception monitor signal C1 from the electrical reception monitor 14. On the other hand, if the electric reception monitor signal C1 is turned OFF, namely, if the AC power supply is interrupted (YES at Step S203), the power supply apparatus 1 turns ON the deterioration diagnosis stop signal C3 as the deterioration diagnosis stop command, and stops the battery deterioration diagnosis. Then, the operational flow proceeds to the service interruption process (Step S206).

If even the battery output voltage $V_B$ is not dropped to the output minimum voltage $V_L$ and the battery deterioration diagnosis signal C2 is still OFF, namely, if the AC power supply is not interrupted and the diagnosis time timer t becomes at the time-up state (YES at Step S204), the operational flow of the power supply apparatus 1 proceeds to the normal operation. As mentioned above, with reference to the timing chart shown in FIG. 2, if the deterioration diagnosis timer T of the timer circuit 20 becomes at the time-up state, the switch 31, the electric reception monitor signal C1, the charging circuit control signal C4 and the relay 29 are ON, and the battery deterioration diagnosis signal C2, the deterioration diagnosis stop signal C3, the output voltage compulsion drop signal C5, the relay 30 and the battery recovery switch 32 are OFF (Points C, E).

The service interruption process will be described below with reference to FIG. 5.

As shown in FIG. 5, the power supply apparatus 1 carries out the service interruption process, if the electric reception monitor signal C1 of the electrical reception monitor 14 is OFF. At this time, the power supply apparatus 1 carries out the control for the service interruption process, namely, turns OFF the battery deterioration diagnosis signal C2 by determining that the deterioration diagnosis is not executed, and turns ON the deterioration diagnosis stop signal C3, and then turns ON the battery charging circuit control signal C4 as the battery charging circuit ON control, and further turns OFF the output voltage compulsion drop signal C5 so that the usual output $V_N$ control is performed on the DC output (Step S300). Meanwhile, the power supply apparatus 1 outputs the battery output voltage $V_B$ from the battery 28, as the output voltage to the external unit 2 from the DC output connector 22. Accordingly, the power supply apparatus 1, when diagnosing the battery deterioration, uses the actually connected load as the load to be used to forcedly discharge the battery 28. Thus, even if the AC power supply is accidentally interrupted during the diagnosis of the battery deterioration, the DC output is supplied in its original state from the battery 28 to the load. Hence, the battery deterioration can be diagnosed without any drop in the output to the load side.

Next, the power supply apparatus 1, after the control for the service interruption process, carries out the monitor until the electric reception monitor signal C1 is turned ON (Step S301). As the monitored result, if the electric reception monitor signal C1 is turned ON, namely, if the service interruption is recovered (YES at Step S301) the power supply apparatus 1 investigates the state of the battery deterioration detection relay 30 (Step S302). If the battery deterioration detection relay 30 is ON under the control state of the battery deterioration detection relay 30, the operational flow proceeds to the process for detecting a battery recovery (YES at Step S302). If the battery deterioration detection relay 30 is OFF, the operational flow of the power supply apparatus 1 proceeds to the normal operation (NO at Step S302). In this way, with reference to the timing chart shown in FIG. 2, if the operational flow of the power supply apparatus 1 proceeds to the service interruption process, the AC input is zero. The switch 31, the deterioration diagnosis stop signal C3 and the charging circuit control signal C4 are ON, and the electric reception monitor signal C1, the battery deterioration diagnosis signal C2, the output voltage compulsion drop signal C5, the relay 29, the relay 30 and the battery recovery switch 32 are OFF (Point F).

The process for detecting the battery recovery will be described below with reference to FIG. 6.

As shown in FIG. 6, the power supply apparatus 1 carries out the process for detecting the battery recovery, if the battery deterioration detection relay 30 is turned ON, in the control state of the battery deterioration detection relay 30, by using the service interruption process. At this time, the power supply apparatus 1 carries out the control for the battery recovery detection, namely, turns OFF the battery deterioration diagnosis signal C2 by determining that the deterioration diagnosis is not executed, and turns ON the deterioration diagnosis stop signal C3, and then turns ON the battery charging circuit control signal C4 as the battery charging circuit ON control, and further turns OFF the output voltage compulsion drop signal C5 so that the usual output $V_N$ control is performed on the DC output (Step S400). Meanwhile, the power supply apparatus 1 outputs the DC output $V_N$. generated by the AC/DC conversion from the DC output connector 22. Then, the power supply apparatus 1, after the control of the battery recovery detection, detects whether or not the battery recovery switch 32 is ON (Step S401). As the detected result, if the battery recovery switch 32 is OFF, the power supply apparatus 1 investigates whether or not it is interrupted (Step S402). As the investigated result, if the electric reception monitor signal C1 is ON, namely, if it is not interrupted (NO at Step S402), the power supply apparatus 1 repeats the operations at the steps S401, S402. If the electric reception monitor signal C1 is OFF, namely, if it is interrupted, the operational flow of the power supply apparatus 1 proceeds to the service interruption process. Also, if the battery recovery switch 32 is ON (YES at Step S401), the power supply apparatus 1 turns OFF the battery deterioration detection relay 30, and carries out the battery recovery detection, and then returns back to the usual operation (Step S403). As mentioned above, with reference to the timing chart shown in FIG. 2, if the operational flow of the power supply apparatus 1 proceeds to the process for detecting the battery recovery, the switch 31, the electric reception monitor signal C1, the deterioration diagnosis stop signal C3, the charging circuit control signal C4, the relay 29 and the relay 30 are ON, and the battery deterioration diagnosis signal C2, the output voltage compulsion drop signal C5 and the battery recovery switch 32 are OFF (Point K). Also, when the battery recovery switch 32 is turned ON in the process for detecting the battery recovery, the switch 31, the electric reception monitor signal C1, the charging circuit control signal C4, the relay 29 and the battery recovery switch 32 are ON, and the battery deterioration diagnosis signal C2, the deterioration diagnosis stop signal C3, the output voltage compulsion drop signal C5 and the relay 2 are OFF (Point L). Here, in the power supply apparatus 1, when the battery recovery switch 32 is turned OFF, the switch 31, the electric reception monitor signal C1, the charging circuit control signal C4 and the relay 29 are ON, and the battery deterioration diagnosis signal C2, the deterioration diagnosis stop signal C3, the output voltage compulsion drop signal C5, the relay 30 and the battery recovery switch 32 are OFF (it returns back to the state of the point A).

As mentioned above, the power supply apparatus 1 according to the first embodiment, when diagnosing the battery deterioration, uses the actually connected load as the load to be used to forcedly discharge the battery. Thus, even if the AC power supply is accidentally interrupted during the diagnosis of the battery deterioration, the DC output is supplied in its original state from the battery to the load. Hence, the battery deterioration can be diagnosed without any drop in the output to the load side. The power supply apparatus 1 has no influence on the load side, since reserving the minimum DC voltage from the AC/DC conversion during the diagnosis of the battery deterioration, in such a way that the output to the connected load side is not dropped even if the battery deterioration causes the DC output from the battery to be instantly dropped, when diagnosing the battery deterioration. Also, the power supply apparatus 1 is not limited to the above-mentioned explanation. The output destination of the deterioration detection relay 30 of the power supply apparatus 1 is not limited to the external unit 2. So, it may be sent to another apparatus. Or, a buzzer may be disposed within the power supply apparatus 1 so as to ring it, or a display containing LED may be disposed to turn on it. Also, the timer circuit 20 may not be disposed within the power supply apparatus 1, and a switch may be disposed within the power supply apparatus 1 so that an input is done by pushing down the switch. Or, the battery deterioration diagnosis signal C2 may be inputted from another apparatus. Moreover, in the power supply apparatus 1, any time may be set for the deterioration diagnosis timer T and the diagnosis time timer t, and the battery deterioration judgment voltage $V_{BL}$ and the output minimum voltage $V_L$ may be freely set.

In the power supply apparatus 1 according to this first embodiment, the external unit 2 connected as the load is used in its original state during the usual operation in diagnosing the battery deterioration. Tentatively, even if the service interruption occurs during the diagnosis of the battery deterioration, in its original state, the voltage can be supplied from the battery 28 without any drop in the output to the connected external device. Also, the power supply apparatus 1 is not limited to the above-mentioned explanation. The power supply apparatus 1 may not have the AC/DC converter 51. So, the DC output may be supplied to the external unit 2 from the battery 28 or the battery charge controller 52. In this case, it is desirable to design the connection so that the switch 31d short-circuits the terminal 31e and the terminal 31f of the switch 31d, and the electrical reception monitor 14 monitors the electric reception condition of the charge controller 16.

From the above-mentioned explanation, the power supply apparatus 1 according to this first embodiment can detect the battery deterioration without any drop in the output voltage to the load side, at the time of the service interruption of the alternating electric power.

Moreover, the power supply apparatus 1 according to this first embodiment can detect the battery deterioration without any drop in the output voltage to the load side, even if the battery deterioration causes the output voltage from the battery to be instantly dropped, at the time of the detection of the battery deterioration (Second Embodiment).

In the first embodiment, the external unit 2 connected as the load is used in its original state during the usual operation in diagnosing the battery deterioration. Tentatively, even if the service interruption occurs during the diagnosis of the battery deterioration, in its original state, the voltage is supplied from the battery 28 without any drop in the output to the connected external device. On the other hand, in addition to the effects of the first embodiment, the second embodiment is designed so as to provide a power supply apparatus further comprising a battery current measuring circuit for measuring a battery current outputted from a battery 28, a dummy load for making a load current flowing through an external unit 2 constant, and a relay for switching whether or not the dummy load is inserted. Accordingly, the diagnosis of the battery deterioration can be made further accurate.

The power supply apparatus according to the second embodiment will be described below with reference to the drawings. However, since the supply of the voltage to the external device in the power supply apparatus according to the second embodiment is similar to that of the first embodiment, its explanation is omitted. Since the operation of the power supply apparatus according to the second embodiment is similar to that of FIG. 3 in the first embodiment, its explanation is omitted. Also, the timing chart in the power supply apparatus according to the second embodiment and the voltage change in the output voltage V from the DC output connector 22 are similar to those of FIG. 2 in the first embodiment, their explanations are omitted. Moreover, since the service interruption process and the process for detecting the battery recovery in the power supply apparatus according to the second embodiment are similar to those of FIGS. 5, 6 in the first embodiment, their explanations are omitted.

Figure 7:
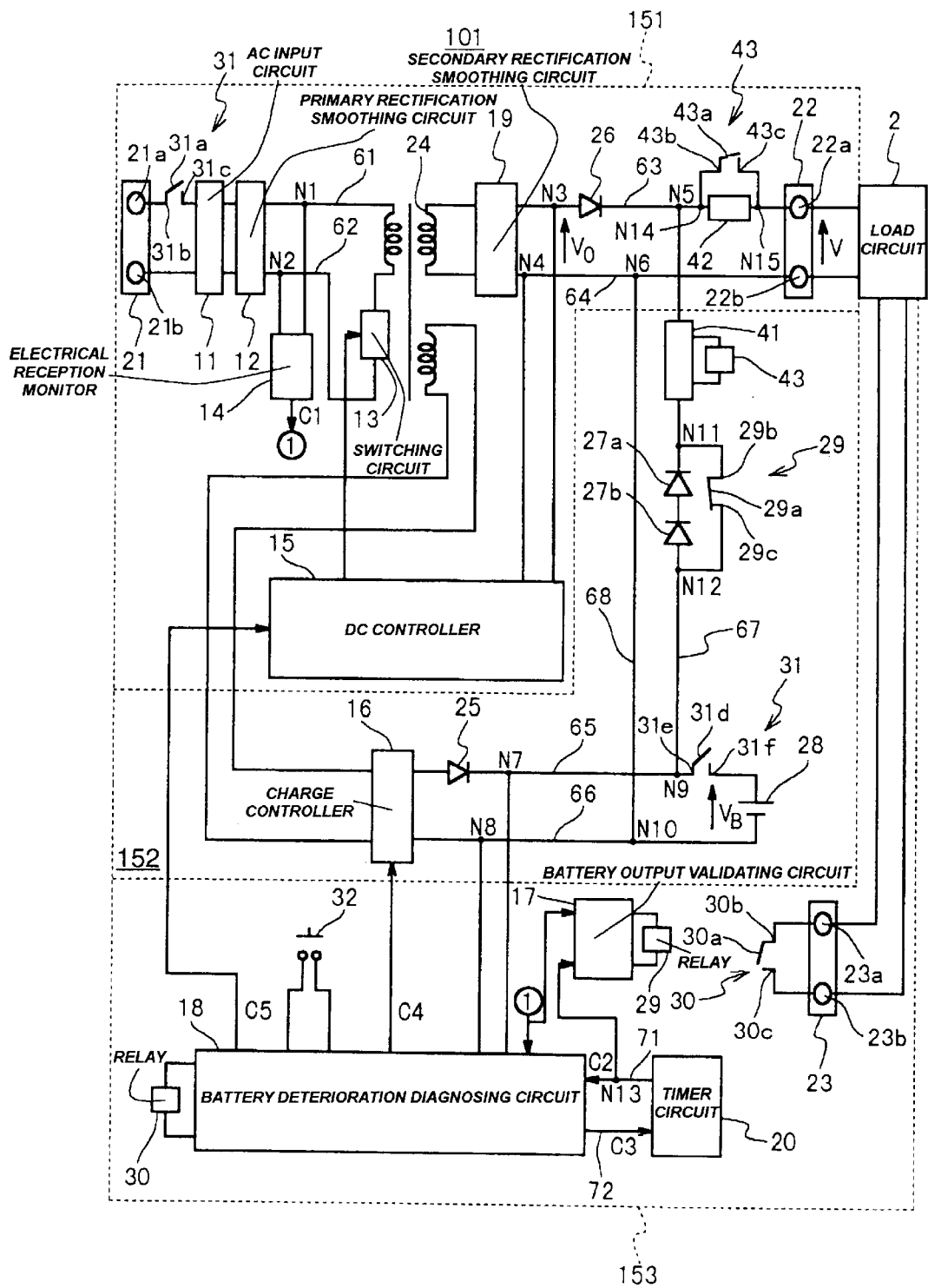
FIG. 7 is a block diagram showing a configuration of a power supply apparatus according to a second embodiment.

FIG. 7 is a block diagram showing the configuration of the power supply apparatus according to the second embodiment.

As shown in FIG. 7, a symbol 101 denotes the power supply apparatus according to the second embodiment. This power supply apparatus 101 is provided with an AC/DC converter 151, battery charge controller 152 and a battery deterioration diagnosing unit 153. The AC/DC converter 151 has an AC input circuit 11, a primary rectification smoothing circuit 12, a switching circuit 13, an electrical reception monitor 14, a DC controller 15, a secondary rectification smoothing circuit 19, a plug 21, a DC output connector 22, a transformer 24, a diode 26, a power supply switch 31 and a dummy load 24. The battery charge controller 152 has a charge controller 16, a diode 25, a diode 27, a battery 28, a battery current measuring circuit 41 and a relay (inserting unit) 43. The battery deterioration diagnosing unit 153 has a battery output validating circuit 17, a battery deterioration diagnosing circuit 18, a timer circuit 20, an output connector 23, a relay 29, a relay 30 and a battery recovery switch 32. Also, an external unit 2 having a load circuit used to forcedly discharge the battery 28 is connected to the power supply apparatus 101. By the way, the plug 21, the DC output connector 22 and the output connector 23 shown in FIG. 7 are illustrated in order to explain the power supply apparatus 101 according to the second embodiment. Although they are necessary for the typical power supply apparatus, the shapes of the plug 21, the DC output connector 22 and the output connector 23 are omitted.

At first, the AC/DC converter 151 in the power supply apparatus 101 is described.

As shown in FIG. 7, the plug 21 connects a power supply line connected to the AC input circuit 11 so that the AC input circuit 11 receives an alternating voltage (hereafter, referred to as an AC voltage). This plug 21 has one terminal 21a and the other terminal 21b to connect the respective power supply lines.

The power supply switch 31 is a linkage switch having two a contacts. This power supply switch 31 is composed of a switch 31a connected to a power supply line between an input terminal of the AC input circuit 11 and one terminal 21a of the plug 21, and a switch 31d connected to a positive side of the battery 28. The switch 31a has a terminal 31b and a terminal 31c. The terminal 31b is connected to the side of the plug 21, and the terminal 31c is connected to the side of the AC input circuit 11. If the switch 31a is turned ON, the terminal 31b and the terminal 31c are connected to each other, and if it is turned OFF, the terminal 31c is opened. This switch 31a of the power supply switch 31 is intended to turn ON/OFF the input to the AC input circuit 11 of the AC voltage. The switch 31d has a terminal 31e and a terminal 31f. The terminal 31e is connected to the side of the charge controller 16, and the terminal 31f is connected to the side of the battery 28. If the switch 31d is turned ON, the terminal 31e and the terminal 31f are connected to each other, and if it is turned OFF, the terminal 31f is opened. This switch 31d of the power supply switch 31 is intended to turn ON/OFF the output of the battery 28.

The AC input circuit 11 receives the AC voltage through a power supply line connected to one input terminal of the AC input circuit 11 from one terminal 21a of the plug 21, and a power supply line connected to the other input terminal of the AC input circuit 11 from the other terminal 21b of the plug 21. The AC input circuit 11, if the switch 31a is closed, receives the AC voltage from the plug 21, and attenuates the external noise coming from the AC line. This AC input circuit 11 is composed of: a noise filter for suppressing a transmission noise occurring in the power supply apparatus 1 and the like; and a rush current protection circuit for suppressing a rush current generated when the power supply switch 31 is turned on.

The primary rectification smoothing circuit 12 receives the AC voltage through a power supply line connected to one input terminal of the primary rectification smoothing circuit 12 from one output terminal of the AC input circuit 11, and a power supply line connected to the other input terminal of the primary rectification smoothing circuit 12 from the other output terminal of the AC input circuit 11. The primary rectification smoothing circuit 12 receives the AC voltage from the AC input circuit 11, and rectifies and smoothes the AC voltage. The primary rectification smoothing circuit 12 outputs the rectified smoothed voltage from a power supply line 61 connected to a terminal of a primary side in the transformer 24 from one output terminal of the primary rectification smoothing circuit 12, and a power supply line 62 connected to an input terminal of the switching circuit 13 from the other output terminal of the primary rectification smoothing circuit 12.

The electrical reception monitor 14 receives the voltage rectified and smoothed by the primary rectification smoothing circuit 12. This electrical reception monitor 14 receives the rectified smoothed voltage through a power supply line branched from a branch point N1 of the power supply line 61 and a power supply line branched from a branch point N2 of the power supply line 62. The electrical reception monitor 14 monitors the output voltage of the primary rectification smoothing circuit 12 to thereby monitor the AC reception state, and then outputs the result as an electric reception monitor signal C1 to the battery output validating circuit 17 and the battery deterioration diagnosing circuit 18.

The transformer 24 receives the rectified smoothed voltage through a power supply line 61 connected to one terminal on a primary side of the transformer 24 from the output terminal of the primary rectification smoothing circuit 12 and a power supply line connected to the other terminal on the primary side of the transformer 24 from the output terminal of the switching circuit 13. Then, it generates a first secondary voltage and a second secondary voltage from the rectified smoothed voltage. The transformer 24 outputs the first secondary voltage through a power supply line connected to one input terminal of the secondary rectification smoothing circuit 19 from one terminal on the first secondary side of the transformer 24 and a power supply line connected to the other input terminal of the secondary rectification smoothing circuit 19 from the other terminal on the first secondary side of the transformer 24. Also, the transformer 24 outputs the second secondary voltage from a power supply line connected to one input terminal of the charge controller 16 from one terminal on the second secondary side of the transformer 24 and a power supply line connected to the other input terminal of the charge controller 16 from the other terminal on the second secondary side of the transformer 24.

The secondary rectification smoothing circuit 19 receives the first secondary voltage through a power supply line connected to one input terminal of the secondary rectification smoothing circuit 19 from one terminal on the first secondary side of the transformer 24 and a power supply line connected to the other input terminal of the secondary rectification smoothing circuit 19 from the other terminal on the first secondary side of the transformer 24, and rectifies and smoothes it, and then converts into a DC output voltage $V_o$.

The DC output connector 22 connects the power supply lines through which the secondary rectification smoothing circuit 19 and the external unit 2 are connected, in order to supply the DC output voltage to the external unit 2 from the secondary rectification smoothing circuit 19. This DC output connector 22 has a terminal 22a and a terminal 22b to manage the power supply lines. The secondary rectification smoothing circuit 19 outputs the DC output voltage $V_o$ to the external unit 2 through a power supply line 63 connected to the terminal 22a of the DC output connector 22 from one output terminal of the secondary rectification smoothing circuit 19 and a power supply line 64 connected to the terminal 22b of the DC output connector 22 from the other output terminal of the secondary rectification smoothing circuit 19. The diode 26 is connected to the power supply line 63. The diode 26 is a reverse flow protection diode. A cathode electrode is arranged on the side of the secondary rectification smoothing circuit 19, and an anode electrode is arranged on the side of the DC output connector 22. Also, the dummy load 42 is connected to the power supply line 63. The dummy load 42 is arranged between the side of the anode electrode of the diode 26 and the side of the output connector 22.

The DC controller 15 receives the DC output voltage $V_o$ rectified and smoothed by the secondary rectification smoothing circuit 19. This DC controller 15 receives the DC output voltage $V_o$ through a power supply line branched from a branch point N3 of the power supply line 63 and a power supply line branched from a branch point N4 of the power supply line 64. Also, the DC controller 15 receives an output voltage compulsion drop signal C5 to at least reserve the DC output voltage $V_o$ from the battery deterioration diagnosing circuit 18. This DC controller 15 controls a switching frequency, in order to adjust the DC output voltage $V_o$ from the secondary rectification smoothing circuit 19, and outputs to the switching circuit 13.

The battery charge controller 152 in the power supply apparatus 101 will be described below.

As shown in FIG. 7, the charge controller 16 receives the second secondary voltage through a power supply line connected to one input terminal of the charge controller 16 from one terminal on the second secondary side of the transformer 24 and a power supply line connected to the other input terminal of the charge controller 16 from the other terminal on the second secondary side of the transformer 24, and then converts it into a DC voltage to charge the battery 28. Also, the charge controller 16 receives a charging circuit control signal C4 to control whether or not the conversion into the DC voltage is done, from the battery deterioration diagnosing circuit 18.

Also, the battery 28 is a backup battery for a service interruption, in order to allow a voltage to be supplied to the external unit 2 even in the service interruption of the AC voltage. Here, the voltage supplied by the battery 28 is a battery output voltage $V_B$. The battery 28 receives a DC voltage through a power supply line 65 connected to a positive electrode of the battery 28 from one output terminal of the charge controller 16 and a power supply line 66 connected to a negative electrode of the battery 28 from the other output terminal of the charge controller 16. The diode 25 and the switch 31b are connected to the power supply line 65. Here, the diode 25 is the diode for protecting a current from reversely flowing into the charge controller 16 from the battery 28. A cathode electrode is arranged on the side of the charge controller 16, and an anode electrode is arranged on the side of the switch 31b.

If the switch 31b is closed, the battery 28 can supply a voltage to the external unit 2 at the time of the service interruption of the AC voltage, through a connection path 67 through which a branch point N5 of the power supply line 63 and a branch point N9 of the power supply line 65 are connected, and a connection path 68 through which a branch point N6 of the power supply line 64 and a branch point N10 of the power supply line 66 are connected. Here, the branch point N5 is located on the power supply line 63 between the diode 26 and the DC output connector. The branch point N9 is located on the power supply line 65 between the diode 25 and the switch 31b. A diode 27a and a diode 27b are connected to the connection path 67. In the diode 27a, an anode electrode is arranged on the side of the branch point N5, and a cathode electrode is arranged on the side of an anode electrode of the diode 27b. Also, in the diode 27b, an anode electrode is arranged on the side of the cathode electrode of the diode 27a, and a cathode electrode is arranged on the side of the branch point N9. The diodes 27a, 27b drop the battery output voltage $V_B$ so that the voltage is not supplied to the external unit 2 from the battery 28 when the AC voltage is received.

The battery current measuring circuit 41, which is connected to the connection path 67, measures a battery current outputted by the battery 28. This battery current measuring circuit 41 is arranged between the branch point N5 and the anode electrode of the diode 27a. Also, the battery current measuring circuit 41 is connected to a relay 43. In the battery current measuring circuit 41, a standard value is defined for judging the measured battery current. The battery current measuring circuit 41, if the battery current is less than the standard value as the judged result, outputs a current for exciting the relay 43, to the relay 43.

The relay 43 has a relay contact 43a of a b contact, and it switches whether or not the dummy load 42 is inserted. The relay contact 43a of the relay 43 is connected to a power supply line branched from a branch point N14 of the power supply line 63 and a power supply line branched from a branch point N15 of the power supply line 63, and it is arranged in parallel to the dummy load 42. Here, the branch point N14 is located between the branch point N5 and the dummy load 42. Also, the branch point N15 is located between the dummy load 42 and the DC output connector 22. The relay contact 43a of the relay 43 has a terminal 43b and a terminal 43c, and short-circuits both ends of the dummy load 42 when the terminal 43b and the terminal 43c are connected to each other. In this relay contact 43a, if a current by which the relay 43 can be excited flows from the battery current measuring circuit 41, the connection between the terminal 43b and the terminal 43c is opened (here, the case when the relay 43 is excited is referred to as ON, and the case when it is not excited is referred to as OFF). At this time, the dummy load 42 is inserted into the power supply apparatus 101. Here, in the battery current measuring circuit 41, the standard value is desired to be defined such that a maximum rated current of the power supply apparatus 101 does not exceed it, due to the insertion of the dummy load 42 into the power supply apparatus 101.

The battery deterioration diagnosing unit 153 in the power supply apparatus 101 will be described below.

As shown in FIG. 7, the battery deterioration diagnosing circuit 18 monitors the battery output voltage $V_B$ at the time of the discharge from the battery 28, through a power supply line branched from a branch point N7 of the power supply line 65 and a power supply line branched from a branch point N8 of the power supply line 66. The relay 30, the battery recovery switch 32 and the timer circuit 20 are connected to the battery deterioration diagnosing circuit 18. Also, in the battery deterioration diagnosing circuit 18, a battery deterioration judgment voltage $V_{BL}$ is set as a voltage lower than the battery output voltage $V_B$. This battery deterioration judgment voltage $V_{BL}$ is the voltage set in order to judge that the battery output voltage $V_B$ indicates the battery deterioration. The battery deterioration diagnosing circuit 18, if the battery output voltage $V_B$ is lower than the battery deterioration judgment voltage $V_{BL}$ as the judged result, outputs a current for exciting the relay 30, to the relay 30. The battery deterioration diagnosing circuit 18 receives the electric reception monitor signal C1 from the electrical reception monitor 14. Also, the battery deterioration diagnosing circuit 18 receives a battery deterioration diagnosis signal C2 from the timer circuit 20, and outputs a battery deterioration diagnosis stop signal C3 to the timer circuit 20. Moreover, the battery deterioration diagnosing circuit 18 outputs a charging circuit control signal C4 to the charge controller 16, and outputs an output voltage compulsion drop signal C5 to the DC controller 15.

The relay 30 is the relay for detecting the battery deterioration, which is connected to the battery deterioration diagnosing circuit 18. Also, the relay 30 is the latch relay having a relay contact 30a of a contact. The relay contact 30a of the relay 30 has a terminal 30b and a terminal 30c. The relay 30 is excited if the battery deterioration diagnosing circuit 18 diagnoses the battery as the deterioration. In this relay contact 30a, if a current by which the relay 30 can be excited flows from the battery deterioration diagnosing circuit 18, the terminal 30b and the terminal 30c are connected to each other. Here, the case when the relay 30 is excited is referred to as ON, and the case when the excitation of the relay 30 is released is referred to as OFF.

The output connector 23 connects the power supply line through which the external unit 2 and the relay contact 30a of the relay 30 are connected to each other. This output connector 23 has a terminal 23a and a terminal 23b which are connected to the external unit 2, respectively. If the battery deterioration diagnosing circuit 18 diagnoses the battery as the deterioration, the relay 30 connects a power supply line connected to the terminal 23a of the output connector 23 from the terminal 30b of the relay contact 30a and a power supply line connected to the terminal 23b of the output connector 23 from the terminal 30c of the relay contact 30a to each other.

The battery recovery switch 32 is connected to the battery deterioration diagnosing circuit 18. If the battery recovery switch 32 is pushed, a current by which the relay contact 30a can be opened flows into the relay 30 from the battery deterioration diagnosing circuit 18. Here, the case when the battery recovery switch 32 is pushed is referred to as ON. In this relay contact 30a, the connection between the terminal 30b and the terminal 30c is opened if a current by which the relay 30 can be turned OFF flows from the battery deterioration diagnosing circuit 18.

The timer circuit 20 is connected to the battery deterioration diagnosing circuit 18, and it clocks a time required to diagnose a battery deterioration. The timer circuit 20 outputs the battery deterioration diagnosis signal C2 from a line 71 from which a signal is outputted to the battery deterioration diagnosing circuit 18, and receives the battery deterioration diagnosis stop signal C3 from a line 72 from which a signal is received from the battery deterioration diagnosing circuit 18.

The battery output validating circuit 17 receives the battery deterioration diagnosis signal C2 generated by the timer circuit 20, from a line branched from a branch point N13 of the line 71. The battery output validating circuit 17 receives the electric reception monitor signal C1 from the electrical reception monitor 14. Also, the battery output validating circuit 17 is connected to the relay 29. In the relay 29, the ON/OFF operation is determined in accordance with the electric reception monitor signal C1 and the battery deterioration diagnosis signal C2 received from the battery output validating circuit 17. If the relay 29 is turned ON, the battery output validating circuit 17 outputs a current for exciting the relay 29, to the relay 29.

The relay 29 has a relay contact 29a of a b contact, and it is the relay intended to short-circuit both ends of the diode 27. The relay contact 29a of the relay 29 is placed on both ends of the diode 27, and it is connected in parallel thereto. The relay contact 29a of the relay 29 has a terminal 29b and a terminal 29c. In the relay contact 29a of the relay 29, the terminal 29b is connected to a power supply line branched from a branch point N11 of the connection path 67, and the terminal 29c is connected to a power supply line branched from a branch point N12 of the connection path 67. The relay 29 short-circuits both the ends of the diode 27 if the terminal 29b and the terminal 29c are connected to each other. In the relay contact 29a, the connection between the terminal 29b and the terminal 29c is opened when a current by which the relay 29 can be excited flows from the battery output validating circuit 17. Here, the case when the relay 29 is excited is referred to as ON, and the case when it is not excited is referred to as OFF.

The operation of the process for diagnosing the battery deterioration in the power supply apparatus 101 according to the second embodiment will be described below with reference to FIG. 8.

FIG. 8 is a flowchart showing the operation of the process for diagnosing the battery deterioration in the power supply apparatus according to the second embodiment.

As shown in FIG. 8, the power supply apparatus 101 carries out a battery deterioration diagnosis setting, if the deterioration diagnosis timer T of the timer circuit 20 becomes at the time-up state. At this time, the power supply apparatus 101 turns ON the battery deterioration diagnosis signal C2, as the control for the battery deterioration diagnosis, namely, as the execution of the deterioration diagnosis, and turns OFF the deterioration diagnosis stop signal C3, and then turns OFF the battery charging circuit control signal C4 as the battery charging circuit OFF control, and further turns ON the output voltage compulsion drop signal C5 so that the DC output is forced to be controlled to an output minimum voltage $V_L$ (Step S200). The battery output validating circuit 17, since the battery deterioration diagnosis signal C2 becomes ON, turns OFF the relay 29, and short-circuits both the ends of the diode 27. Thus, the battery output voltage $V_B$ is outputted in its original state from the DC output connector 22 (at this time, the battery output voltage $V_B$>the output minimum voltage $V_L$ of the DC output). As mentioned above, with reference to the timing chart shown in FIG. 2, if the deterioration diagnosis timer T of the timer circuit 20 becomes at the time-up state, the switch 31, the electric reception monitor signal C1, the battery deterioration diagnosis signal C2 and the output voltage compulsion drop signal C5 are ON, and the deterioration diagnosis stop signal C3, the charging circuit control signal C4, the relay 29, the relay 30 and the battery recovery switch 32 are OFF (Points B, D and H).

Next, as shown in FIG. 8, the power supply apparatus 101, after the control of the battery deterioration diagnosis at the step S201, sets a diagnosis time timer t by using the timer circuit 20 (Step S201). Then, the power supply apparatus 101 always monitors the battery current by using the battery current measuring circuit 41 (Step S209). Meanwhile, if the battery current is less than the standard value (YES at Step S209), the battery current measuring circuit 41 turns ON the relay 43. In the relay contact 43a of the relay 43, the connection between the terminal 43b and the terminal 43c is opened, and the dummy load 42 is inserted into the power supply apparatus 101 (Step S211). Also, if the battery current is equal to or greater than the standard value (NO at Step S209), since the battery current measuring circuit 41 still turns OFF the relay 43, the dummy load 42 is not inserted into the power supply apparatus 101 (Step S210). Next, the power supply apparatus 101 monitors the battery output voltage $V_B$ (Step S202). Meanwhile, if the battery output voltage $V_B$ is not dropped to the battery deterioration judgment voltage $V_{BL}$ from which the battery is judged as the deterioration (NO at Step S202), the power supply apparatus 101 judges whether or not it is interrupted (Step S203). If the electric reception monitor signal C1 of the electrical reception monitor 14 is not OFF (NO at Step S203), the operational flow of the power supply apparatus 101 proceeds to the diagnosis time timer t (Step S204). If the diagnosis time timer t of the timer circuit 20 is not at the time-up state, the operational flow of the power supply apparatus 101 proceeds to a diagnosis time timer t subtraction (Step S205) Next, the power supply apparatus 101 decrements the content of the diagnosis time timer t of the timer circuit 20, and the operational flow returns back to the step S209. In this way, the power supply apparatus 101 repeats the operations at the steps S209 and S202 to S205 until the diagnosis time timer t of the timer circuit 20 becomes at the time-up state, and counts down the diagnosis time timer t. In the power supply apparatus 101, as the monitored result of the battery output voltage $V_B$ (Step S202), if the battery output voltage $V_B$ is dropped to the battery deterioration judgment voltage $V_{BL}$ from which the battery is judged as the deterioration (YES at Step S202), the power supply apparatus 101 judges that the battery is deteriorated, and turns ON a battery deterioration detection relay 30, and then sends a battery deterioration signal from the connector 23 to the external unit 2 (Step S207). At the same time, the power supply apparatus 101 turns ON the deterioration diagnosis stop signal C3 as a deterioration diagnosis stop command, and stops the battery deterioration diagnosis. Then, the operational flow of the power supply apparatus 101 proceeds to the process for detecting a recovery (Step S208). As mentioned above, as for the level of the output voltage V from the DC output connector 22 shown in FIG. 2, although the battery output voltage $V_B$ is dropped to the battery deterioration judgment voltage $V_{BL}$ (Point I) and the battery output voltage $V_B$ is deteriorated and dropped to the output minimum voltage $V_L$ or less (Point J), it becomes the DC output voltage $V_o$ (=$V_L$) of the secondary rectification smoothing circuit 19>the battery output voltage $V_B$ (=$V_L$). The power supply apparatus 101, until the stop of the deterioration diagnosis (Point K), carries out the AC/DC conversion from the DC output connector 22, and outputs the output minimum voltage $V_L$ by using the output voltage compulsion drop signal C5 and the DC controller 15 so that the output to the external unit 2 is not dropped. Accordingly, in the power supply apparatus 101, at the time of the battery deterioration diagnosis, even if the battery deterioration causes the DC output from the battery 28 to be instantly dropped, the output to the connected load side is not dropped. That is, the battery deterioration diagnosis of the power supply apparatus 101 has no influence on the load side, even if the battery deterioration causes the DC output from the battery 28 to be instantly dropped, when the battery deterioration diagnosing unit 53 diagnoses the battery deterioration, since the minimum DC voltage is reserved in the AC/DC converter 151.

If the diagnosis time timer t is counted down (Steps S209 and S202 to S205), the power supply apparatus 101 also monitors the electric reception monitor signal C1 from the electrical reception monitor 14. On the other hand, if the electric reception monitor signal C1 is turned OFF, namely, if the AC power supply is interrupted (YES at Step S203), the power supply apparatus 101 turns ON the deterioration diagnosis stop signal C3 as the deterioration diagnosis stop command, and stops the battery deterioration diagnosis. Then, the operational flow proceeds to the service interruption process (Step S206).

If even the battery output voltage $V_B$ is not dropped to the output minimum voltage $V_L$ and the battery deterioration diagnosis signal C2 is still OFF, namely, if the AC power supply is not interrupted and the diagnosis time timer t becomes at the time-up state (YES at Step S204), the operational flow of the power supply apparatus 101 proceeds to the normal operation. In this way, with reference to the timing chart shown in FIG. 2, if the deterioration diagnosis timer T of the timer circuit 20 becomes at the time-up state, the switch 31, the electric reception monitor signal C1, the charging circuit control signal C4 and the relay 29 are ON, and the battery deterioration diagnosis signal C2, the deterioration diagnosis stop signal C3, the output voltage compulsion drop signal C5, the relay 30 and the battery recovery switch 32 are OFF (Points C, E).

As mentioned above, the power supply apparatus 101 according to the second embodiment is further provided with the dummy load 42, the battery charge controller 52, the battery current measuring circuit 41 for measuring the current supplied from the battery 28, and the relay 43 for inserting the dummy load 42 into the external unit 2 in series, in the power supply apparatus 1 according to the first embodiment. So, the battery current measuring circuit 41 controls the relay 43 so that the dummy load 42 is inserted into the external unit 2 in series, on the basis of the measured current value and the predetermined current value. Thus, the current supplied to the external unit 2 can be made constant to thereby provide the battery deterioration diagnosis which has the further accurate diagnosis result.

The power supply apparatus 101, when diagnosing the battery deterioration, uses the actually connected load as the load to be used to forcedly discharge the battery. Thus, even if the AC power supply is accidentally interrupted during the diagnosis of the battery deterioration, the DC output is supplied in its original state from the battery to the load. Hence, the battery deterioration can be diagnosed without any drop in the output to the load side. The power supply apparatus 101 has no influence on the load side, since reserving the minimum DC voltage from the AC/DC conversion during the diagnosis of the battery deterioration, in such a way that the output to the connected load side is not dropped even if the battery deterioration causes the DC output from the battery to be instantly dropped, when diagnosing the battery deterioration. Also, the power supply apparatus 101 is not limited to the above-mentioned explanation. The output destination of the deterioration detection relay 30 of the power supply apparatus 101 is not limited to the external unit 2. So, it may be sent to another apparatus. Or, a buzzer may be disposed within the power supply apparatus 101 so as to ring it, or a display containing LED may be disposed to turn on it. Also, the timer circuit 20 may not be disposed within the power supply apparatus 101, and a switch may be disposed within the power supply apparatus 101 so that an input is done by pushing down the switch. Or, the battery deterioration diagnosis signal C2 may be inputted from another apparatus. Moreover, in the power supply apparatus 101, any time may be set for the deterioration diagnosis timer T and the diagnosis time timer t, and the battery deterioration judgment voltage $V_{BL}$ and the output minimum voltage $V_L$ may be freely set. Moreover, in the power supply apparatus 101, the two selections are done, such as the insertion of the dummy load 42 and the non-insertion thereof. However, the dummy load 42 may be variable so that the load current flowing into the external unit 2 from the DC output connector 22 becomes constant correspondingly to the current value of the battery current measuring circuit 41.

Also, in the power supply apparatus 101 according to the second. embodiment, the external unit 2 connected as the load is used in its original state during the usual operation in diagnosing the battery deterioration. Tentatively, even if the service interruption occurs during the diagnosis of the battery deterioration, in its original state, the voltage can be supplied from the battery 28 without any drop in the output to the connected external device. Also, the power supply apparatus 101 is not limited to the above-mentioned explanation. The power supply apparatus 1 may not have the AC/DC converter 51. So, the DC output may be supplied to the external unit 2 from the battery 28 or the battery charge controller 52. In this case, it is desirable to design the connection so that the switch 31d short circuits the terminal 31e and the terminal 31f of the switch 31d, and the electrical reception monitor 14 monitors the electric reception condition of the charge controller 16.

From the above-mentioned explanation, as for the power supply apparatus 101 according to the second embodiment, in addition to the effects of the first embodiment, this is the power supply apparatus that is further provided with the battery current measuring circuit for measuring the battery current outputted from the battery 28, the dummy load, and the relay for switching between the insertion of the dummy load and the non-insertion. Thus, the diagnosis of the battery deterioration can be made further accurate.

In the power supply apparatus according to the present invention, the battery deterioration can be detected without any drop in the output voltage to the load side, at the time of the service interruption of the alternating electric power.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-331891 (Filed on Oct. 31, 2000) including specification, claims, drawings and summary are incorporated herein by reference in its entirety.

What is claimed is:

1. A power supply apparatus connected to a load circuit comprising:
    a battery charging controller that is connected to a battery and charges this battery at a first voltage; and
    a diagnosing circuit for diagnosing a deterioration of said battery in accordance with a voltage of said battery,
    wherein an electric power is supplied to said load circuit from said battery or said battery charging controller.

2. A power supply apparatus connected to a load circuit comprising:
    a battery charging controller that is connected to a battery and charges said battery at a first voltage; and
    a voltage controller that is connected to said load circuit and generates a second voltage and then controls the second voltage so as to supply a constant voltage to said load circuit,
    wherein an electric power is supplied to said load circuit from at least one of said battery, said battery charging controller and said voltage controller.

3. A power supply apparatus connected to a load circuit comprising:
    a battery charging controller that is connected to a battery and charges said battery at a first voltage;
    a voltage controller that is connected to said load circuit and generates a second voltage and then controls the second voltage so as to supply a constant voltage to said load circuit; and
    a diagnosing circuit for diagnosing a deterioration of this battery in accordance with a voltage of said battery,
    wherein an electric power is supplied to said load circuit from at least one of said battery, said battery charging controller and said voltage controller.

4. A power supply apparatus according to claim 1, further comprising an inserting unit for inserting a dummy load into said load circuit in series so as to supply a constant current to said load circuit.

5. A power supply apparatus according to claim 4, further comprising a current measuring circuit for measuring a value of a current supplied from said battery or said battery charging controller, and controlling said inserting unit so as to insert said dummy load into said load circuit in series, on the basis of measured said current value and a set current value.

6. A power supply apparatus according to claim 1,
wherein said battery charging controller receives an alternating voltage and generates said first voltage,
said diagnosing circuit, when an input of said alternating voltage is stopped during a diagnosis of a deterioration of said battery, stops the diagnosis of the deterioration of said battery, and
an electric power is supplied to said load circuit from said battery or said battery charging controller.

7. A power supply apparatus according to claim 1,
wherein said diagnosing circuit outputs a predetermined charging control signal to said battery charging controller, and
said battery charging controller charges said battery in response to said charging control signal.

8. A power supply apparatus according to claim 1, wherein said diagnosing circuit compares said battery voltage with a set voltage, and diagnoses a deterioration of said battery in accordance with the compared result.

9. A power supply apparatus according to claim 1, further comprising an electrical reception monitor for monitoring an electrical reception condition of an alternating voltage, and outputting an electrical reception signal to said diagnosing circuit,
wherein said battery charging controller receives said alternating voltage and generates said first voltage, and
said diagnosing circuit stops or resumes a diagnosis of a deterioration of said battery, in response to said electrical reception signal.

10. A power supply apparatus according to claim 9, further comprising a period setting circuit for setting a set period,
wherein said diagnosing circuit, when the electrical reception of said alternating voltage is stopped in said set period set by said period setting circuit, stops the diagnosis of the deterioration of said battery, and when the electrical reception of said alternating voltage is recovered, resumes the diagnosis of the deterioration of said battery.

11. A method of diagnosing a deterioration of a battery, in a power supply apparatus connected to a load circuit, comprising the steps of:
(a) charging said battery at a first voltage;
(b) setting a set voltage;
(c) comparing a battery voltage with said set voltage;
(d) diagnosing the deterioration of said battery in accordance with a result compared at said step (c); and
(e) supplying the battery voltage or the first voltage to said load circuit.

12. A method of diagnosing a deterioration of a battery, in a power supply apparatus connected to a load circuit, comprising the steps of:
(a) charging said battery at a first voltage;
(b) setting a set voltage;
(c) comparing a battery voltage with said set voltage;
(d) diagnosing the deterioration of said battery in accordance with a result compared at said step (c);
(f) generating a second voltage, and controlling the second voltage so as to supply a constant voltage to said load circuit; and
(g) supplying at least one voltage of the battery voltage, the first voltage and the second voltage to said load circuit.

13. A method of diagnosing a deterioration of a battery, in a power supply apparatus according to claim 11, further comprising the step of:
(h) inserting a dummy load into said load circuit in series so as to supply a constant current to said load circuit.

14. A method of diagnosing a deterioration of a battery, in a power supply apparatus according to claim 12, further comprising the step of:
(h) inserting a dummy load into said load circuit in series so as to make a current supplied to said load circuit constant.

15. A method of diagnosing a deterioration of a battery, in a power supply apparatus according to claim 13, further comprising the steps of:
(i) setting a set current;
(j) measuring a value of a current supplied from said battery or a current corresponding to said second voltage; and
(k) inserting said dummy load into said load circuit in series, on the basis of said set current and said value measured at said step (j).

16. A method of diagnosing a deterioration of a battery, in a power supply apparatus according to claim 14, further comprising the steps of:
(i) setting a set current;
(j) measuring a value of a current supplied from said battery or a current corresponding to said second voltage; and
(k) inserting said dummy load into said load circuit in series, on the basis of said set current and said value measured at said step (j).

17. A method of diagnosing a deterioration of a battery, in a power supply apparatus according to claim 11, further comprising the steps of:
(l) setting a set period;
(m) executing said step (c) and said step (d) at a time of an elapse of said set period;
(n) receiving an alternating voltage;
(o) monitoring an electrical reception of said alternating voltage, in accordance with said set period;
(p) stopping said step (c) and said step (d) when the electrical reception of said alternating voltage is stopped; and
(q) resuming said step (c) and said step (d) when the electrical reception of said alternating voltage is recovered.

18. A method of diagnosing a deterioration of a battery, in a power supply apparatus according to claim 12, further comprising the steps of:
(l) setting a set period;
(m) executing said step (c) and said step (d) at a time of an elapse of said set period;
(n) receiving an alternating voltage;
(o) monitoring an electrical reception of said alternating voltage, in accordance with said set period;

(p) stopping said step (c) and said step (d) when the electrical reception of said alternating voltage is stopped; and (q) resuming said step (c) and said step (d) when the electrical reception of said alternating voltage is recovered.

19. A method of diagnosing a deterioration of a battery, in a power supply apparatus according to claim 11, further comprising the steps of:

(r) stopping said step (c) and step (d) when said battery is diagnosed as a deterioration at said step (d); and (s) resuming said step (c) and said step (d) when said battery diagnosed as said deterioration is recovered.

20. A method of diagnosing a deterioration of a battery, in a power supply apparatus according to claim 12, further comprising the steps of:

(r) stopping said step (c) and step (d) when said battery is diagnosed as a deterioration at said step (d); and (s) resuming said step (c) and said step (d) if said battery diagnosed as said deterioration is recovered.

* * * * *

UNITED STATES PATENT AND TRADEMARK OFFICE
CERTIFICATE OF CORRECTION

PATENT NO.     : 6,737,832 B2
DATED          : May 18, 2004
INVENTOR(S)    : Hiroshi Uchida It is certified that error appears in the above-identified patent and that said Letters Patent is hereby corrected as shown below:

Title page,
Item [56], References Cited, FOREIGN PATENT DOCUMENTS, please add
-- JP    2-23800        2/1990 --

Signed and Sealed this

Seventeenth Day of August, 2004

JON W. DUDAS
*Acting Director of the United States Patent and Trademark Office*